US011926291B2

(12) United States Patent
Beck, III et al.

(10) Patent No.: US 11,926,291 B2
(45) Date of Patent: Mar. 12, 2024

(54) CONCRETE MIXER TRUCK CLEANING SYSTEM

(71) Applicant: Beck Manufacturing International, Inc., Converse, TX (US)

(72) Inventors: James Frank Beck, III, San Antonio, TX (US); James Frank Beck, II, San Antonio, TX (US); Thomas Christopher Beck, San Antonio, TX (US)

(73) Assignee: Beck Manufacturing International, Inc., Converse, TX (US)

(*) Notice: Subject to any disclaimer, the term of this patent is extended or adjusted under 35 U.S.C. 154(b) by 794 days.

(21) Appl. No.: 16/989,659

(22) Filed: Aug. 10, 2020

(65) Prior Publication Data
US 2021/0024039 A1 Jan. 28, 2021

Related U.S. Application Data

(63) Continuation of application No. 15/794,575, filed on Oct. 26, 2017, now Pat. No. 10,737,664, which is a
(Continued)

(51) Int. Cl.
*B60S 1/64* (2006.01)
*B01F 35/10* (2022.01)
(Continued)

(52) U.S. Cl.
CPC ............ *B60S 1/64* (2013.01); *B01F 35/1452* (2022.01); *B08B 9/00* (2013.01); *B08B 9/0813* (2013.01);
(Continued)

(58) Field of Classification Search
CPC . B60S 1/64; B08B 9/00; B08B 9/0813; B08B 9/093; B28C 5/4203; B28C 7/00; B60P 3/16; B01F 35/145; B01F 35/1452
(Continued)

(56) References Cited

U.S. PATENT DOCUMENTS

| 1,922,700 A | 8/1933 | Knowles |
| 2,003,719 A | 6/1935 | McCrery |

(Continued)

FOREIGN PATENT DOCUMENTS

| CN | 201745549 | 2/2011 |
| CN | 201768724 | 3/2011 |

(Continued)

OTHER PUBLICATIONS

David Shuffield, "Collection Hopper Wash System," Holcim Ltd., Feb. 12, 2015, 10 pages.
(Continued)

*Primary Examiner* — Charles Cooley
(74) *Attorney, Agent, or Firm* — Kowert, Hood, Munyon, Rankin & Goetzel, P.C.; Dean M. Munyon

(57) ABSTRACT

A cleaning system is disclosed for cleaning concrete residue from a concrete mixer truck. The cleaning system may include a water delivery system having one or more conduits configured to deliver pressurized water to one or more spray headers positioned at various back-end portions of the truck. The cleaning system further includes one or more valves configured to control the flow of pressurized water through the one or more conduits to the one or more spray headers. In various embodiments, the one or more valves are manually operable to control the release of water to the spray headers. In other embodiments, the one or more valves are controlled by a computing device through an electrical coupling such as a communication bus. The cleaning system may be configured to clean different portions of the truck using different sets of spray headers at different times as part of a washing protocol.

20 Claims, 21 Drawing Sheets

Related U.S. Application Data continuation of application No. 15/261,922, filed on Sep. 10, 2016, now Pat. No. 9,802,578.

(60) Provisional application No. 62/266,093, filed on Dec. 11, 2015, provisional application No. 62/217,693, filed on Sep. 11, 2015.

(51) Int. Cl.

| | | |
|---|---|---|
| *B08B 9/00* | (2006.01) | |
| *B08B 9/08* | (2006.01) | |
| *B08B 9/093* | (2006.01) | |
| *B28C 5/42* | (2006.01) | |
| *B28C 7/00* | (2006.01) | |
| *B60P 3/16* | (2006.01) | |

(52) U.S. Cl.
CPC ............ *B08B 9/093* (2013.01); *B28C 5/4203* (2013.01); *B28C 7/00* (2013.01); *B60P 3/16* (2013.01)

(58) Field of Classification Search
USPC .......................................................... 366/138
See application file for complete search history.

(56) References Cited

U.S. PATENT DOCUMENTS

| | | | |
|---|---|---|---|
| 2,270,628 A | 1/1942 | Fitzgerald | |
| 2,284,250 A | 5/1942 | Ball et al. | |
| 2,413,488 A | 12/1946 | Draeger | |
| 2,703,703 A | 3/1955 | Nargelovic | |
| 2,732,189 A | 1/1956 | Gerst | |
| 3,460,812 A | 8/1969 | Kaufman | |
| 4,478,514 A | 10/1984 | Hudelmaier | |
| 4,544,275 A | 10/1985 | Hudelmaier | |
| 5,713,663 A | 2/1998 | Zandberg et al. | |
| 6,036,352 A | 3/2000 | Sakamoto | |
| 6,155,277 A | 12/2000 | Barry | |
| 6,354,439 B1* | 3/2002 | Arbore | B07B 1/04 |
| | | | 209/420 |
| 6,418,948 B1* | 7/2002 | Harmon | B28C 5/468 |
| | | | 134/198 |
| 7,581,557 B2 | 9/2009 | Lindblom et al. | |
| 7,594,524 B2 | 9/2009 | DeCollibus et al. | |
| 7,780,335 B2 | 8/2010 | Rosaen | |
| 8,020,431 B2 | 9/2011 | Cooley et al. | |
| 8,382,915 B2 | 2/2013 | Shook | |
| 8,911,138 B2* | 12/2014 | Cook | B28C 5/422 |
| | | | 366/19 |
| 8,960,990 B2 | 2/2015 | Koehler et al. | |
| 9,370,801 B1* | 6/2016 | Short, Jr. | B01F 29/63 |
| 2002/0179119 A1* | 12/2002 | Harmon | B08B 9/093 |
| | | | 134/198 |
| 2007/0086270 A1* | 4/2007 | Harris | B08B 9/0813 |
| | | | 366/59 |
| 2012/0250446 A1* | 10/2012 | Cook | B28C 5/422 |
| | | | 366/19 |
| 2013/0276288 A1 | 10/2013 | Topacio | |
| 2014/0269142 A1 | 9/2014 | Huizer | |
| 2015/0217344 A1 | 8/2015 | Tanaka | |
| 2015/0217480 A1 | 8/2015 | van der Wel et al. | |
| 2017/0072916 A1* | 3/2017 | Beck, III | B28C 7/00 |
| 2021/0146888 A1* | 5/2021 | McNeilus | B60P 3/16 |
| 2022/0080475 A1* | 3/2022 | Camell | B05B 15/68 |
| 2022/0111559 A1* | 4/2022 | Wurtz | B28C 5/4272 |
| 2023/0182179 A1* | 6/2023 | Cullen | B08B 3/02 |
| | | | 134/37 |

FOREIGN PATENT DOCUMENTS

| | | |
|---|---|---|
| CN | 102233612 | 11/2011 |
| CN | 202556584 | 11/2012 |
| CN | 203185494 | 9/2013 |
| CN | 203344910 | 12/2013 |
| CN | 203511591 | 4/2014 |
| CN | 204095763 | 1/2015 |
| CN | 104475413 | 4/2015 |
| CN | 104520144 | 4/2015 |
| CN | 204282826 | 4/2015 |
| CN | 204746940 | 11/2015 |
| CN | 105501191 | 4/2016 |
| DE | 4336029 | 6/1994 |
| EP | 1437184 | 8/2012 |
| EP | 2789404 | 10/2014 |
| EP | 2789404 A1 * | 10/2014 |
| EP | 2845704 | 3/2015 |
| GB | 2338429 | 12/1999 |
| IN | 203020279 | 6/2013 |
| JP | S60-56186 | 4/1985 |
| JP | S61-13888 | 6/1986 |
| JP | S62-54033 | 4/1987 |
| JP | H05-254637 | 10/1993 |
| JP | H06-055526 | 3/1994 |
| JP | H08-049651 | 2/1996 |
| JP | H08-309730 | 11/1996 |
| JP | H10-009124 | 1/1998 |
| JP | H10-286820 | 10/1998 |
| JP | 2005199859 | 7/2005 |
| KR | 101402040 | 6/2014 |
| WO | WO-0059638 A1 * | 10/2000 |
| WO | 2013/073961 | 5/2013 |
| WO | 2014/071526 | 5/2014 |

OTHER PUBLICATIONS

International Search Report & Written Opinion in Application No. PCT/US2016/051190 dated Nov. 18, 2016, 20 pages.

International Preliminary Report in Application No. PCT/US2016/051190 dated Sep. 1, 2017, 23 pages.

Office Action in U.S. Appl. No. 15/261,922 dated Dec. 22, 2016, 20 pages.

* cited by examiner

500

```
┌─────────────────────────────────────────────┐
│ Operate an in-transit concrete mixing truck │
│           to dispense concrete.             │
│                    502                      │
└─────────────────────────────────────────────┘
                      │
                      ▼
┌─────────────────────────────────────────────┐
│ After dispensing the concrete, operate a cleaning system coupled
│ to the truck to clean concrete residue from one or more back-end
│ portions of the truck, wherein the cleaning system includes a water
│ delivery system configured to deliver pressurized water via one or
│ more conduits to a plurality of spray headers coupled to the truck,
│ wherein the cleaning system further includes one or more valves
│ operable to control the release of pressurized water from the
│ plurality of spray headers to automatically clean one or more back-
│            end portions of the truck.
│                    504
└─────────────────────────────────────────────┘
```

```
┌─────────────────────────────────────────────┐
│ Operate an in-transit concrete mixing truck │
│           to dispense concrete.             │
│                    522                      │
└─────────────────────────────────────────────┘
                      │
                      ▼
┌─────────────────────────────────────────────┐
│ After dispensing the concrete, instruct a cleaning system coupled
│ to the truck to initiate a process to clean concrete residue from the
│ truck, wherein the cleaning system includes a water delivery
│ system configured to deliver pressurized water via one or more
│ conduits to one or more spray headers coupled to the truck,
│ wherein the cleaning system further includes a computing device
│ electrically coupled to one or more valves and configured to
│ automatically operate the one or more valves to control the release
│ of pressurized water from the one or more spray headers to clean
│ concrete residue from one or more back-end portions of the truck.
│                    524
└─────────────────────────────────────────────┘
```

FIG. 17

CONCRETE MIXER TRUCK CLEANING SYSTEM

CROSS-REFERENCE TO RELATED APPLICATIONS

The present application is a continuation of U.S. application Ser. No. 15/794,575 filed Oct. 26, 2017 (now U.S. Pat. No. 10,737,664), which is a continuation of U.S. application Ser. No. 15/261,922, filed Sep. 10, 2016 (now U.S. Pat. No. 9,802,578), which claims the benefit of U.S. Provisional Appl. No. 62/217,693, filed Sep. 11, 2015, and U.S. Provisional Appl. No. 62/266,093, filed Dec. 11, 2015. The disclosures of each of the above-referenced applications are incorporated by reference herein in their entireties.

BACKGROUND

Ready-mix concrete is concrete that is chemically specified for its purpose and then mixed, either at the concrete batch plant or by a concrete mixer truck en route to a job site, where the concrete is dispensed according to the customer's requirements. At the factory or central plant, concrete ingredients (rock, sand, cement, fly ash, water, admixtures, fiber, etc.) are funneled into the mixing drum powered by the truck. These ingredients, when mixed, are highly adhesive by nature. Accordingly, before entering public roads, the portions of the truck around the area where the ingredients were received are cleaned off to prevent buildup. As the truck travels to the job site, the mixing drum typically rotates to keep the ingredients active (i.e., not hardened) and to ensure uniformity throughout the load. At the job site, the wet concrete is discharged from the mixer through an assembly that includes one or more hoppers and one or more chutes. After the concrete is unloaded, it is necessary to clean any area of the truck that came into contact with the concrete.

Accordingly, in one embodiment, the dry ingredients for concrete may be produced at a dry batch plant and then mixed into wet concrete in a concrete mixer truck while in transit to a job site. In a different embodiment, wet concrete may be produced at a central mix plant and then transported to a job site in an agitating truck, which keeps the concrete from setting while in transit. Regardless of whether the truck actually mixes dry ingredients with water into wet concrete or simply agitates pre-mixed wet concrete, similar cleaning processes may be used. For purposes of this disclosure, "mixing" concrete and similar terms are defined as including agitating pre-mixed concrete. Thus a "concrete mixer truck" may be a truck that receives dry ingredients and mixes them into wet concrete, or it may be a truck that receives wet concrete and agitates the wet concrete to prevent premature setting.

Industry-standard practice is for the operator to manually clean the truck utilizing water from the on-board water supply, which is directed through valves to hoses mounted in close proximity to the portions of the mixer that will require cleaning. Many concrete mixer trucks have two hoses. A first hose is used for cleaning a lower portion of the truck, typically from ground level, while a second hose mounted at the top of a ladder platform is used for cleaning those portions of the truck that cannot effectively be cleaned from the ground.

The ready-mix concrete industry is, in effect, more of a perishable freight logistics business than a construction business. The contents of each truck, by design, will begin to harden within a short time after being mixed. Each load must be carefully orchestrated and every minute is valuable. Additionally, this industry operates on narrow profit margins and relies on volume to realize financial gains, so truck fleet efficiency and utilization are highly valued.

SUMMARY

The need for improved efficiency in delivering ready-mix concrete is met by the various disclosed embodiments of cleaning systems for in-transit concrete mixer trucks. Disclosed embodiments leverage existing water-based cleaning systems present on mixer trucks to clean concrete residue from back-end portions of the truck previously cleaned manually by truck operators. (The terms "back-end" and "rear-end" are used interchangeably herein.) These portions include the collection hopper, drum surge blades, drum discharge blades, drum shell, and drum drip ring. In some embodiments, these cleaning systems include one or more spray headers positioned at various locations on the back-end of the truck to dispense pressurized water received through one or more conduits (e.g., tubing) that are connected to a water supply of the truck. One or more valves control the flow of pressurized water to the one or more spray headers. In some embodiments, the one or more valves are configured to be manually operated to control the release of water to the one or more spray headers. In other embodiments, a computing device electrically coupled to the one or more valves is configured to automatically operate the one or more valves to control the release of water to the one or more spray headers. These embodiments of the disclosed cleaning system may provide a solution that obviates the need for a truck operator to climb a ladder to clean the uppermost back-end portions of the truck that come into contact with wet concrete. In addition to this safety improvement, this cleaning system will also result in improved fleet efficiency, among other advantages.

BRIEF DESCRIPTION OF THE DRAWINGS

FIG. 16 illustrates an example of a process flow according to one embodiment.

FIG. 17 illustrates another example of a process flow according to one embodiment.

DETAILED DESCRIPTION

Existing concrete mixer trucks operate with an on-board water supply. This water supply is typically used for two primary purposes. First, water from the tank is used to supply water to the drum during the concrete manufacturing process (i.e., the making of concrete). This is not a cleaning function. Second, water from the tank is supplied to hoses that can be used by an operator of the truck to manually clean rear-end portions of the truck that have come into contact with wet concrete. Because some of these portions are located at the top-most portion of the truck and are thus above a height where they can be cleaned effectively by an operator standing on the ground, trucks are typically equipped with a ladder that provides the operator access to clean these locations. The ladder may be used for other functions less frequently, but it is used for gaining access to clean most frequently. The use of the ladder is disadvantageous for at least two reasons. First, a very high percentage of accidents and injuries associated with concrete mixer trucks are a result of ascending and descending the ladder. Any reduction in climbing events is of tremendous value to the operator. Second, the ladder and platform add weight to a class of vehicles that is highly regulated with respect to weight. The solutions described herein will reduce climbing events. They may also lead to removal of ladders from mixer trucks altogether. But even if ladders are not removed from trucks immediately, the automated cleaning systems disclosed herein will lead to a reduction in their use.

The disclosed cleaning systems automate and improve the efficiency of this cleaning activity by using dedicated, conduits and spray headers that may in some embodiments be permanently affixed and are positioned to clean various portions of the back-end of concrete mixer trucks in response to operation of one or more valves. In some embodiments, these valves may be operated manually. In other embodiments, the one or more valves may be operated automatically by a computing device.

Figure 1:
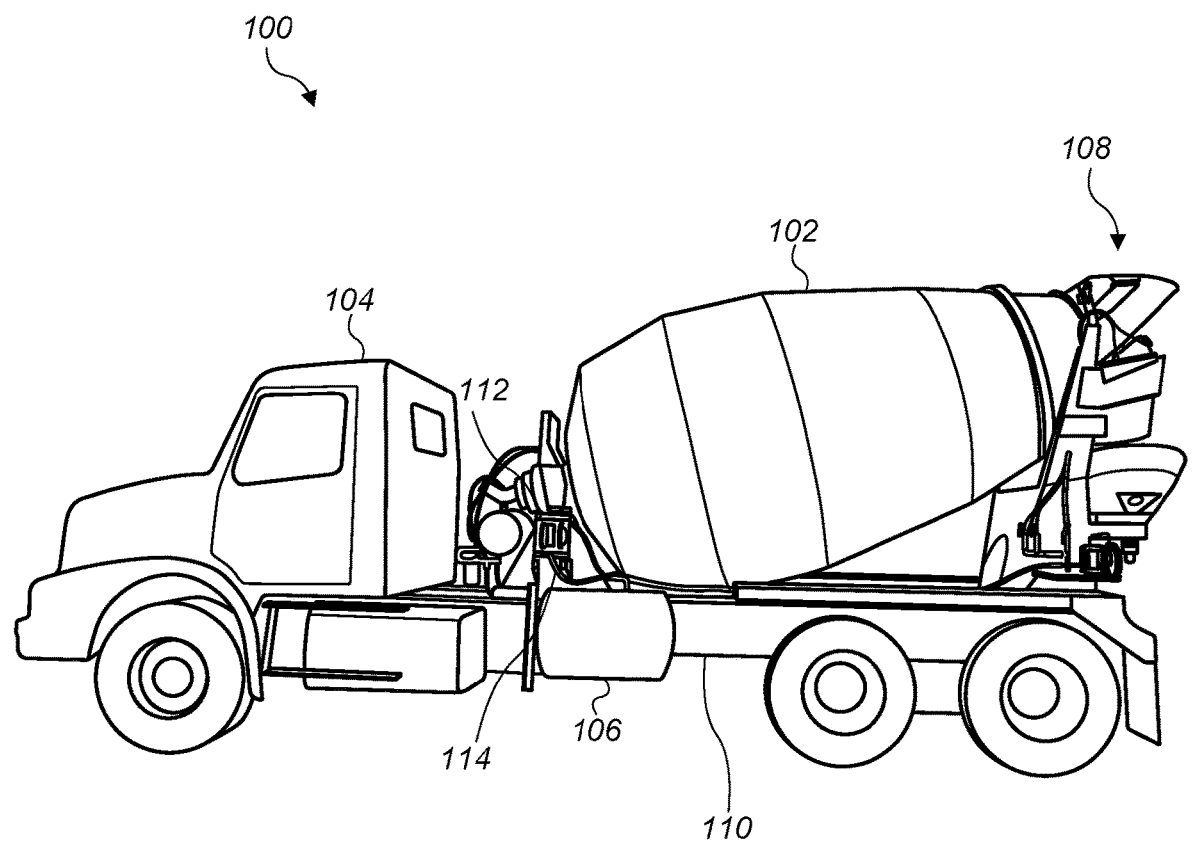
FIG. 1 illustrates a side view of one embodiment of a concrete mixer truck.

Turning now to FIG. 1, a side view of concrete mixer truck 100 is shown. The chassis assembly of concrete mixer truck 100 includes cab 104 in which the driver sits and frame 110 coupled to the truck and configured to receive a payload. Drum 102 for holding and mixing wet concrete and a water supply system may further be coupled to the chassis assembly. The water supply system includes, in this embodiment, water tank 106, diaphragm pump 112, and various associated water lines 114. One of ordinary skill in the art will recognize that various other types of pump may be used instead of a diaphragm pump. For example, any type of pump operable to pressurize water through electronic, hydraulic, pneumatic, or other means may be used. In some embodiments, diaphragm pump 112 may be operated via a primary and/or secondary air supply system of a concrete mixer truck. In other embodiments, the water tank itself may supply pressure without the use of a separate water pump. The water supply system and functional equivalents thereof may be referred to as a "water delivery means for providing water." Concrete mixer truck 100 further includes back-end portion 108, discussed in more detail below.

In the embodiment depicted in FIG. 1, water tank 106 need not be under pressure. Diaphragm pump 112 may draw water from water tank 106 from water line 114 shown in the top center portion of the tank. (Although it cannot be seen in FIG. 1, this water line 114 extends within the tank to draw water from the bottom of the tank.)

The embodiment depicted in FIG. 1 may thus be considered a non-pressurized system, in that water tank 106 may be at ambient air pressure. In other embodiments, water tank 106 may be pressurized, for example to a relatively low pressure, such as 55 PSI. In both pressurized and non-pressurized embodiments, however, the water is typically pressurized by the time it is used for cleaning. That is, the water eventually delivered to the spray headers may be at some higher pressure even in a non-pressurized system; for example, various types of spray header may work well with water pressures in the range of 40 to 150 PSI. For example, diaphragm pump 112 may receive water (pressurized or unpressurized) from water tank 106, and then pressurize the received water to a pressure of approximately 100-150 PSI. In some embodiments, air pressure (e.g., from the truck's existing air tank and air compressor, or via a separate pump, etc.) may be used to pressurize water tank 106 and direct water to the rear of the truck via one or more of water lines 114. Other options include a stand-alone pressure storage tank configured to provide consistent water pressure for longer periods of time and with less reliance on the truck's air compressor to supply newly compressed air.

Figure 2:
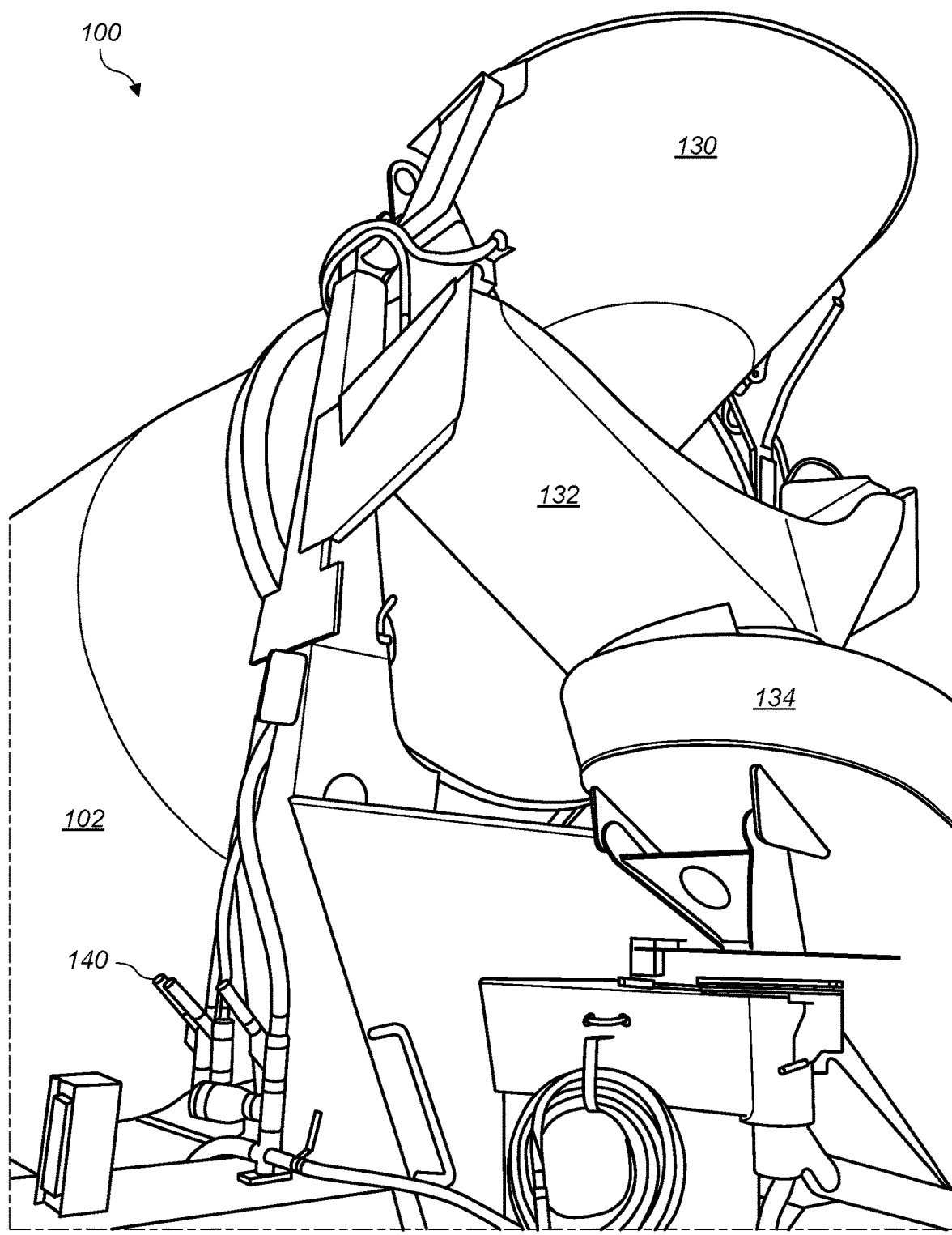
FIG. 2 illustrates a rear portion of one embodiment of a concrete mixer truck.

Turning now to FIG. 2, the back-end of concrete mixer truck 100 is shown. There are a number of elements of the back-end of a concrete mixer truck that come into contact with wet concrete during the discharge process; only some of these are visible in FIG. 2, and others will be illustrated in other figures. As shown in FIG. 2, the back-end of concrete mixer truck 100 includes charge hopper 130, collection hopper 132, and chute 134.

The phrase "discharge assembly" generally refers to a series of structures configured to receive and direct the concrete expelled from the drum for dispensing at a job site. In this embodiment, the discharge assembly includes collection hopper 132 (configured to receive expelled concrete from the drum) and one or more chutes 134 (configured to receive and direct concrete from the collection hopper).

Figure 10A:
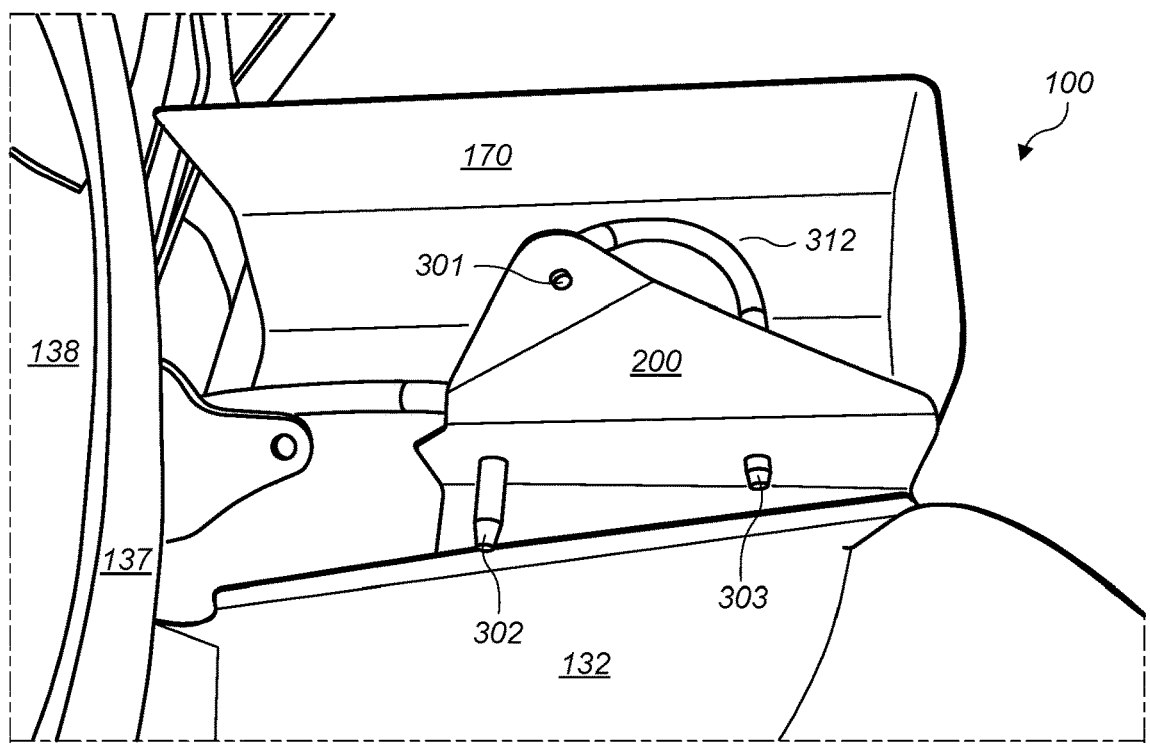
FIGS. 10A-10E illustrate one embodiment of a set of spray headers configured to clean rear-end portions of a concrete mixer truck.
Figure 11A:
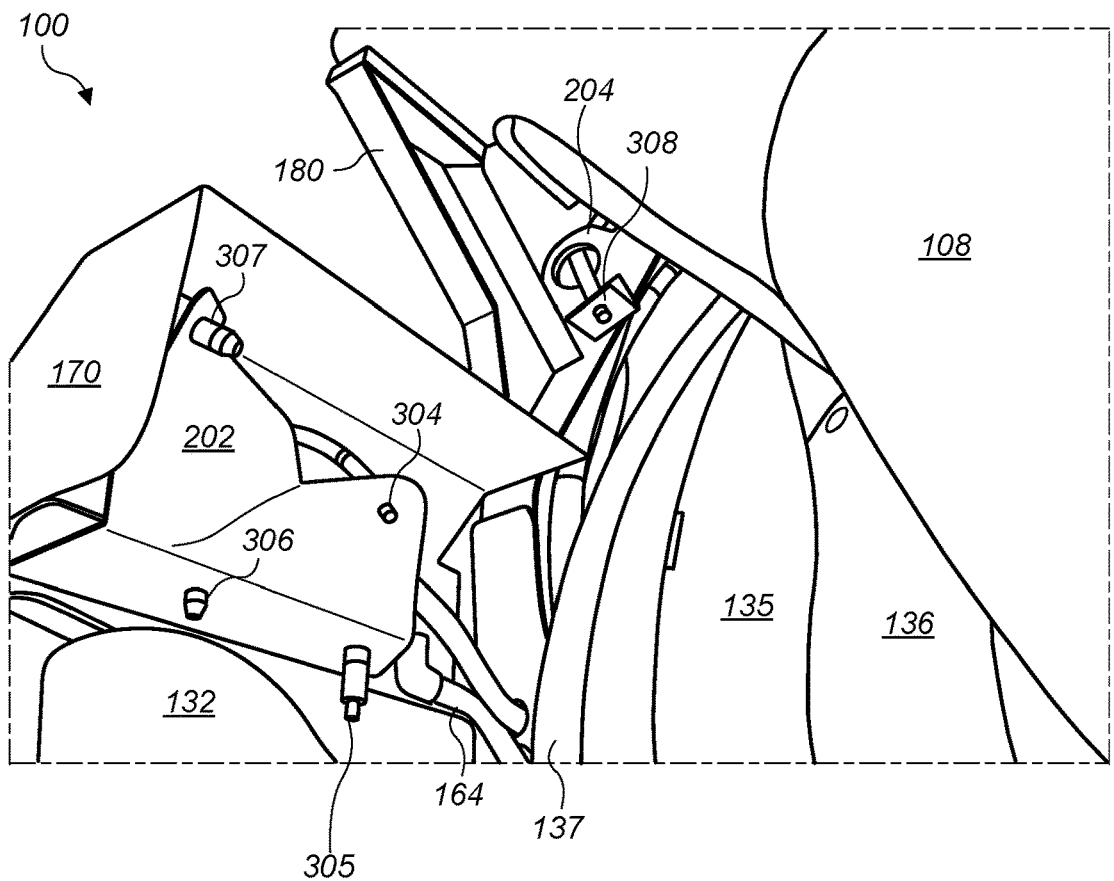
FIGS. 11A-11E illustrate another embodiment of a set of spray headers configured to clean rear-end portions of a concrete mixer truck.

The phrase "rear portion of the drum" refers to various other elements (not visible in FIG. 2) that may come into contact with wet concrete. The rear portion of drum 102 may include surge blades 135 used to help reduce the surging of large quantities of concrete from the drum at once; discharge blades 136 that actually expel concrete from drum 102; drum drip ring 137, which is the lip around the cavity in drum 102 where concrete is expelled; and drum shell 138, which is the inside surface of drum 102 itself (These elements that are not visible in FIG. 2 are shown in FIGS. 10A and 11A.)

Various embodiments of the disclosed cleaning systems are configured to automatically clean the rear portion of the drum, at least a portion of the discharge assembly, or both. In some embodiments, only a portion of the discharge assembly (e.g., collection hopper 132) is cleaned automatically; in these embodiments, chute(s) 134, which are located in closer proximity to the ground, may still need to be cleaned manually. As used herein, the concept of "automatically" cleaning rear-end portions of a concrete mixer truck includes an operator initiating and carrying out the washing process without physically having to direct or operate a hose, the headers, or nozzles performing the cleaning. As will be discussed below, in some embodiments, an operator (either the driver of the truck or any other individual) may initiate the cleaning process by manually operating one or more valves. In other embodiments, an operator may initiate the cleaning process by interacting with a computing device. In yet other embodiments, cleaning functions may be initiated without direct human intervention, for example by a computing device receiving information from the truck, or from a GPS unit, etc., and being programmed to initiate cleaning without human intervention. For example, a washing protocol could be initiated when a truck reaches a selected location; alternatively or in addition, a washing protocol could be initiated when a certain event is detected to have occurred (e.g., the truck has completed loading or unloading). Thus, as used herein, an operator who uses a hose to direct the flow of pressurized water to clean a concrete mixer truck is not "automatically" cleaning the truck, in contrast to cleaning system embodiments disclosed herein. In some embodiments, however, portions of the discharge assembly and/or rear portion of the drum may be cleaned automatically according to this disclosure, while other portions may be cleaned manually.

Figure 3:
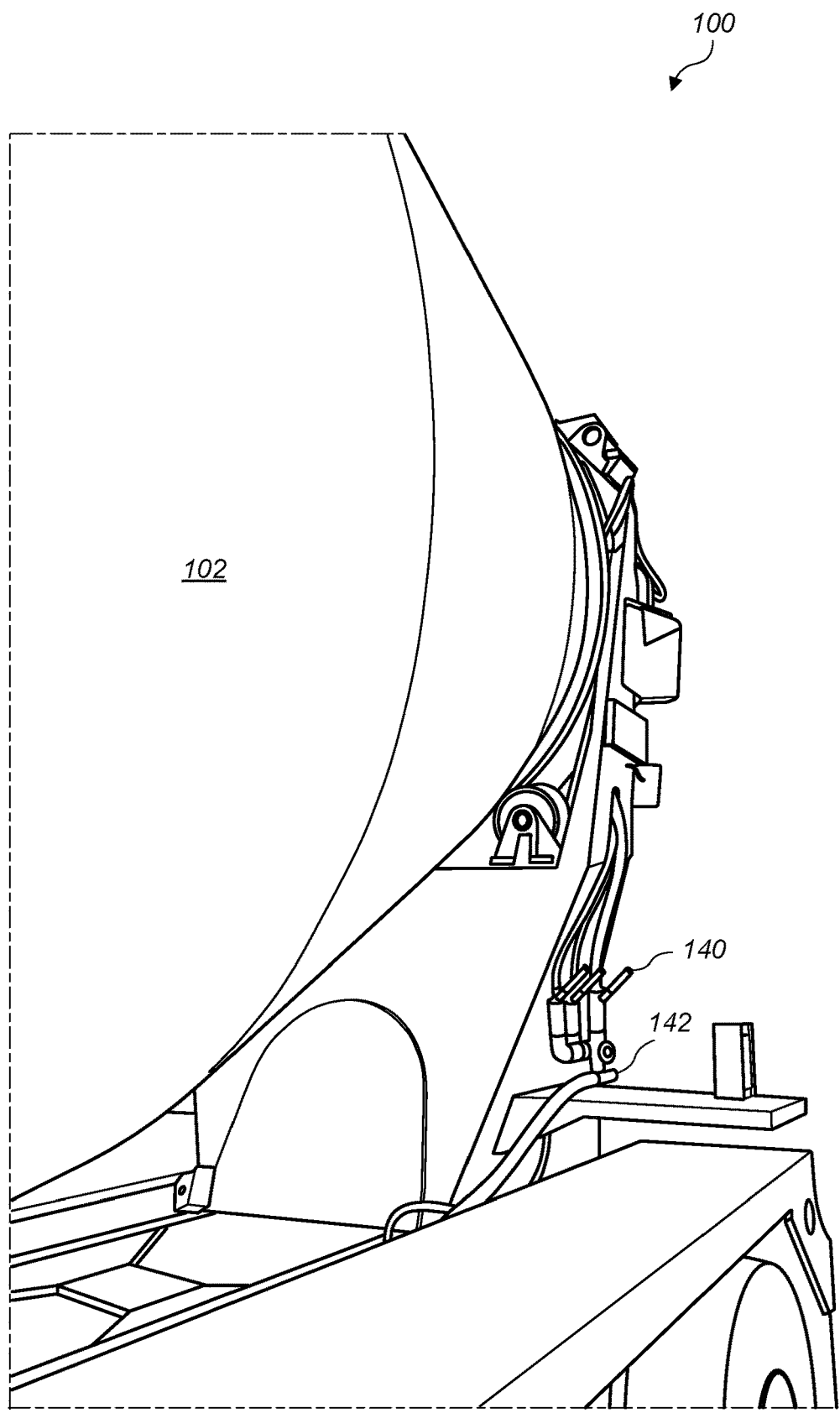
FIG. 3 illustrates a rear side portion of one embodiment of a concrete mixer truck.

Turning now to FIG. 3, an embodiment is shown that includes valves 140, some or all of which may be used for operating an automatic cleaning system according to this disclosure. However, this embodiment also includes hose 142 for additional manual cleaning operations, should such manual cleaning operations be necessary in addition to automatic cleaning. Such an embodiment might be used, for example, to allow an operator to automatically clean collection hopper 132, but manually clean chute(s) 134. Or such an embodiment might be used to allow an operator to automatically clean a given portion of the rear end of concrete mixer truck 100 and manually clean some other portion. Various other combinations of automatic and manual cleaning will be apparent to one of ordinary skill in the art with the benefit of this disclosure.

Figure 4:
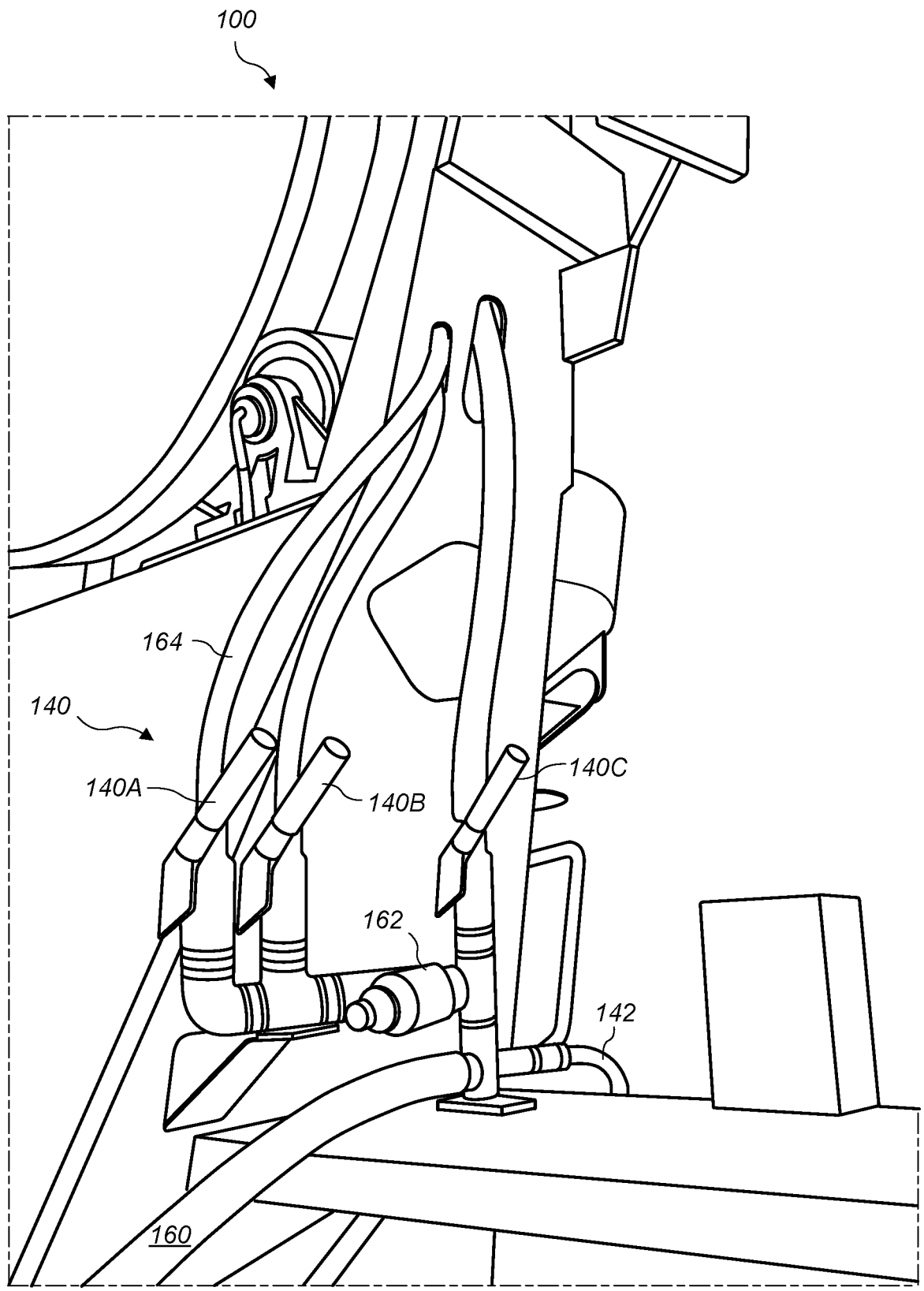
FIG. 4 illustrates a set of valves of one embodiment of a cleaning system of a concrete mixer truck.

Turning now to FIG. 4, a close-up view of one embodiment of a set of valves 140 operable to dispense water is shown. Valves 140 include valve 140A, valve 140B, and valve 140C. Water supply line 160 supplies water to the cleaning system from diaphragm pump 112 (as depicted in FIG. 1). This water has four possible points of exit. First, the water is supplied to a manually operable hose 142 that is usable to manually clean lower portions of a rear end of the truck. Second, the water is supplied to valve 140C, which includes a conduit that is used to inject water into the drum in order to manufacture concrete. (Valve 140C is thus not used for cleaning purposes.) Finally, the water flows through water filter 162 (e.g., an inline water filter) to valves 140A and 140B. Use of a water filter may be desirable in some embodiments to eliminate debris that could clog the spray headers that are used to direct cleaning water onto the various surfaces to be cleaned. In some embodiments, water filter 162 may be in line before valve 140C instead of after. In yet other embodiments, water filter 162 may be omitted altogether.

In the embodiment shown in FIG. 4, valve 140A is used to operate a group of spray headers (headers 301-306, as depicted in FIGS. 10A-E and 11A-E) primarily associated with cleaning the collection hopper. Valve 140B, on the other hand, is used to operate a different group of headers (headers 307 and 308) that are primarily associated with cleaning a rear portion of the drum and/or drip ring (as depicted in FIG. 11A). In other embodiments, different arrangements may be used, such that any desired subset of one or more spray headers may be operated by a given valve.

FIG. 4 depicts a plurality of conduits 164 (e.g. flexible tubing) respectively coupled to valves 140A and 140B. A different type of conduit is shown attached to valve 140C. One of ordinary skill in the art with the benefit of this disclosure will understand various types of suitable conduit that may be used with any or all of valves 140. The various spray headers disclosed herein and functional equivalents thereof may be referred to (individually or collectively) as "cleaning means for washing" a portion of a concrete mixer truck. The valves and functional equivalents thereof may be referred to as "control means for operating" a cleaning system. In embodiments in which the valves are operated via a computing device, the computing device and functional equivalents thereof may also be considered to be part of the "control means for operating" the cleaning system.

In some embodiments, one or more of valves 140 may be operated by spring-loaded levers (sometimes known as dead man's switches or dead man's valves), such that when they are not actively engaged (e.g., held down) by an operator, the switch will move back to the "off" position, closing the valve. In other embodiments, the valves are operated by a standard switch that remains open until manually moved back to the off position. In other embodiments, the cleaning system may include one or more timing devices (e.g., a digital display) configured to display information regarding a length of time that a valve has been activated. For example, such a device might display a length of time that a valve has been opened, or provide a countdown from some predetermined washing interval. Such devices and their equivalents may be usable to aid the operator in knowing when to close a valve that has been opened. In various embodiments, such timing devices may be used to notify the operator that sufficient time has passed, or to automatically close a given valve when sufficient time has passed.

Figure 5:
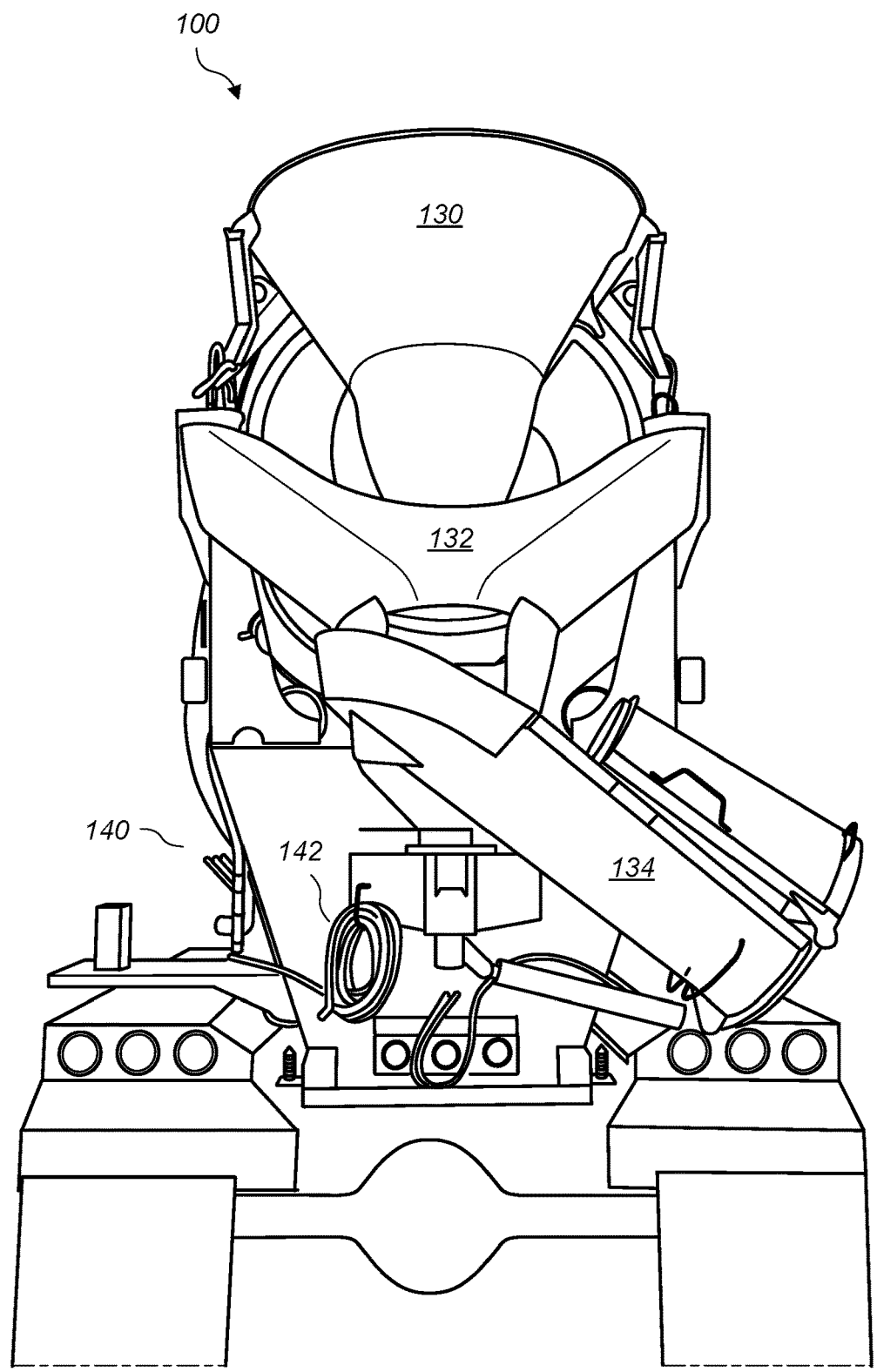
FIG. 5 illustrates a rear portion of one embodiment of a concrete mixer truck.

Turning now to FIG. 5, another view of the rear portion of concrete mixer truck 100 is shown. The various elements included in FIG. 5 have been described above, and FIG. 5 shows a different perspective to aid in understanding their arrangement in one embodiment. Charge hopper 130, collection hopper 132, chute 134, valves 140, and hose 142 are visible in this figure.

Figure 6:
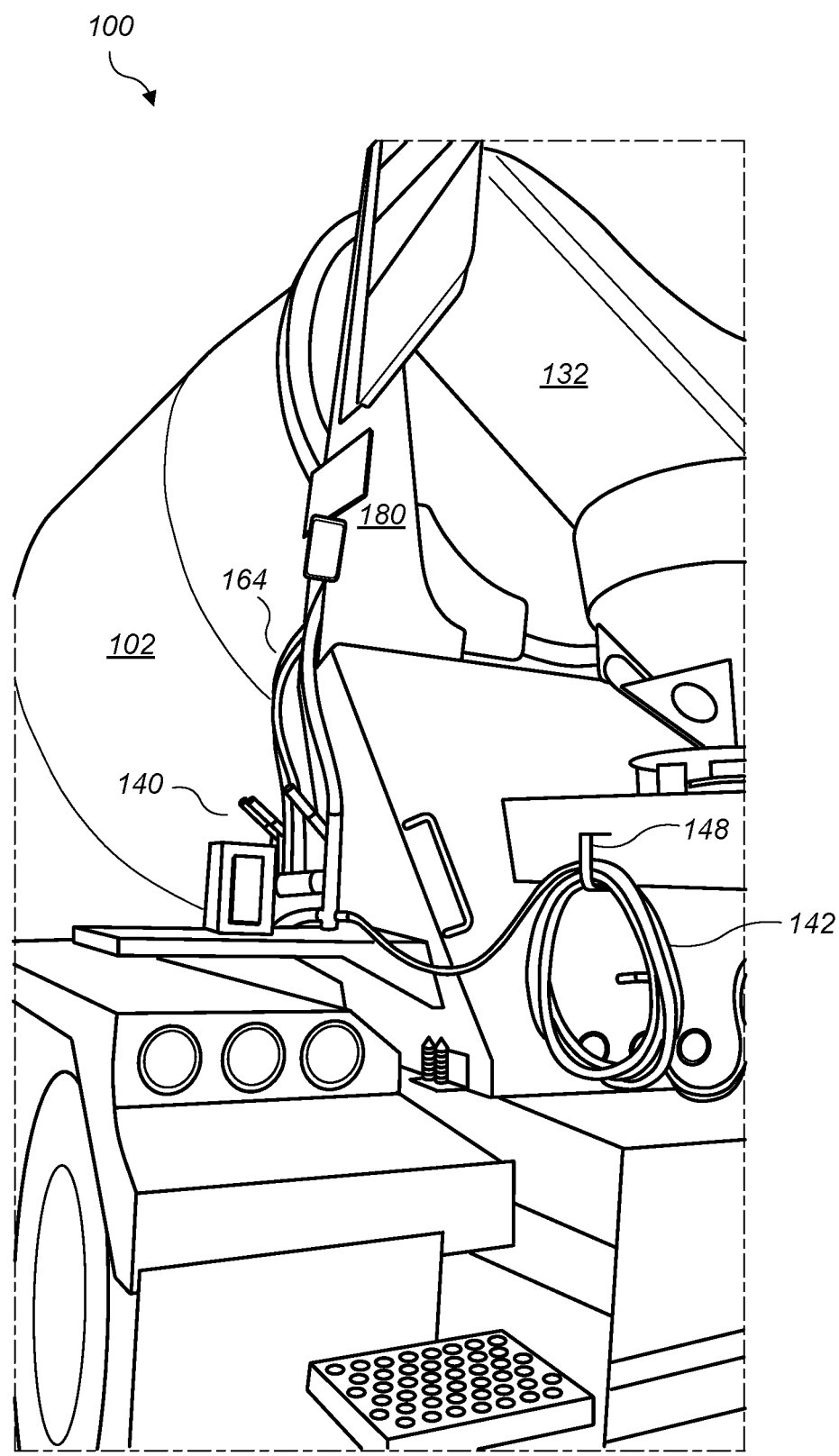
FIG. 6 illustrates a rear portion of another embodiment of a concrete mixer truck.

Turning now to FIG. 6, one embodiment of a rear, driver side portion of concrete mixer truck 100 is depicted. As with FIG. 5, the various elements included in FIG. 6 have been described above, but FIG. 6 shows a different perspective to aid in understanding their arrangement in one embodiment. FIG. 6 shows the positioning of valves 140 and conduits 164 previously discussed. As will be discussed further below, one of the conduits 164 from valve 140A may be coupled to spray headers on both sides of the truck. Accordingly, in one embodiment, this particular conduit 164 splits on the driver side of the truck, and a portion of this particular conduit 164 is routed up over drum hoop 180 to the passenger side of the truck. In other embodiments, differing numbers of valves may be used, as well as different conduit routing paths.

FIG. 6 also depicts a standard hose 142 coupled to the pressurized water supply, which may be used for manual cleaning as needed. Note that in this embodiment, due to the automated cleaning system, there is a reduced need for a ladder or another hose to clean the upper portions of the mixer rear end. (On the particular mixer truck shown in FIG. 6, the ladder and upper hose have been eliminated altogether.) FIG. 6 further shows the relation of collection hopper 132 to drum 102. As can be seen, collection hopper 132 is a funnel-like structure positioned next to drum 102 to receive expelled concrete. In some embodiments, a guard structure 170 (not shown in FIG. 6, but discussed below) may be used on the driver's side of collection hopper 132. A similar guard structure may also be included on the passenger side of collection hopper 132. As will be shown in FIGS. 10A and 11A, this guard structure is positioned over a bracket to which various spray headers are affixed. Guard structure 170 is configured to protect the spray headers from being damaged by any foreign objects (e.g., tree limbs), particularly during transit. Some embodiments may of course omit one or both of such guard structures. Below collection hopper 132 is a portion of the main chute (not labeled), which may be movable to dispense concrete as needed.

As shown, hose 142 is coupled to concrete mixer truck 100 via hook 148. In some embodiments, hook 148 may be open on top such that the hose and nozzle may be lifted off, and in other embodiments a closure mechanism may be used to secure the hose and/or nozzle in place against concrete mixer truck 100. Hook 148 and functional equivalents thereof may also be referred to as "retention means for securing" the hose and the nozzle.

Figure 7:
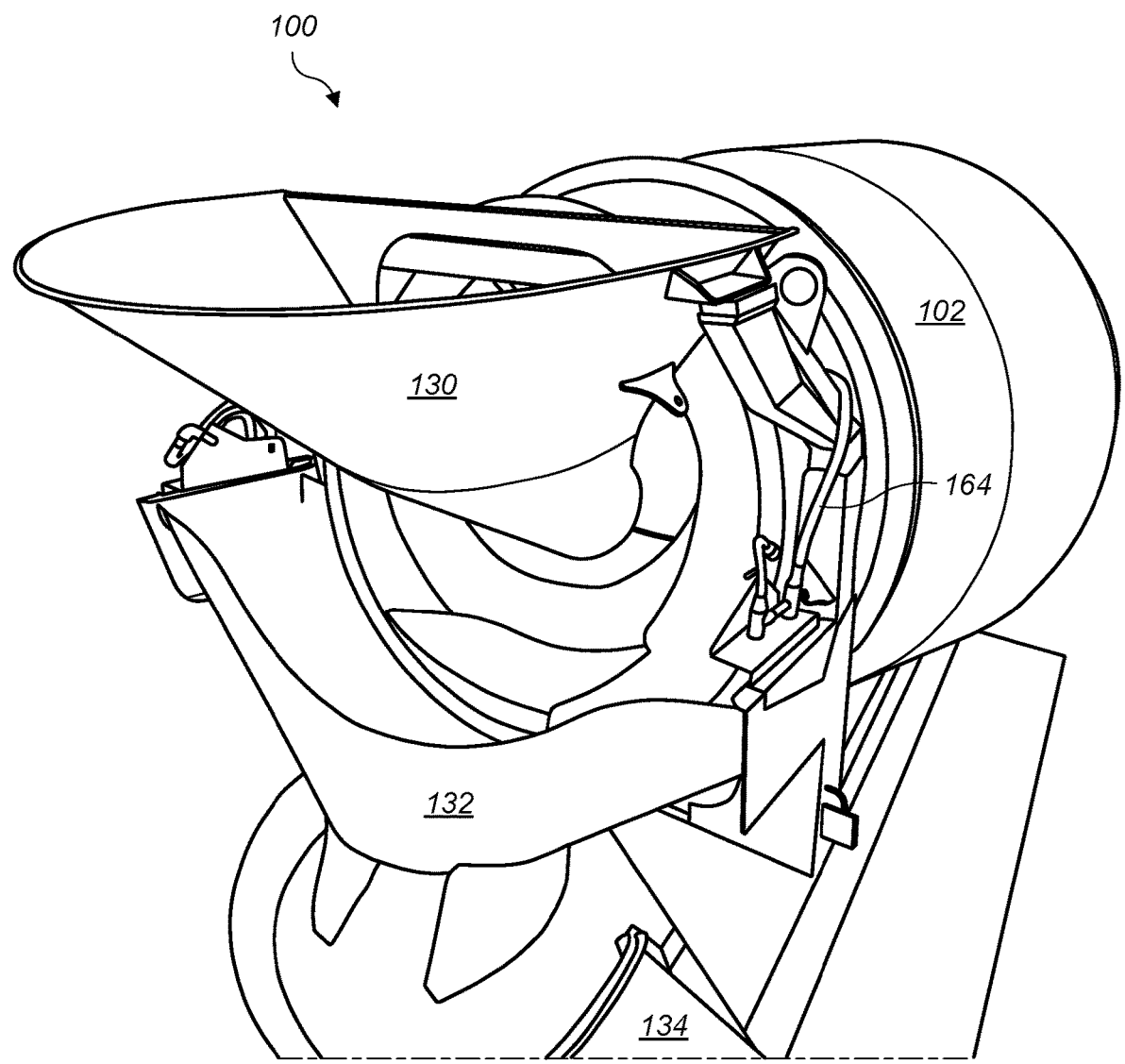
FIG. 7 illustrates a rear portion of another embodiment of a concrete mixer truck.

Turning now to FIG. 7, another view of the rear portion of concrete mixer truck 100 is shown. The various elements included in FIG. 7 have been described above, and FIG. 7 shows a different perspective to aid in understanding their arrangement in one embodiment. In particular, one branch of split conduit 164 mentioned above is shown passing over drum 102 to feed a set of spray headers on the passenger side of concrete mixer truck 100.

Figure 8:
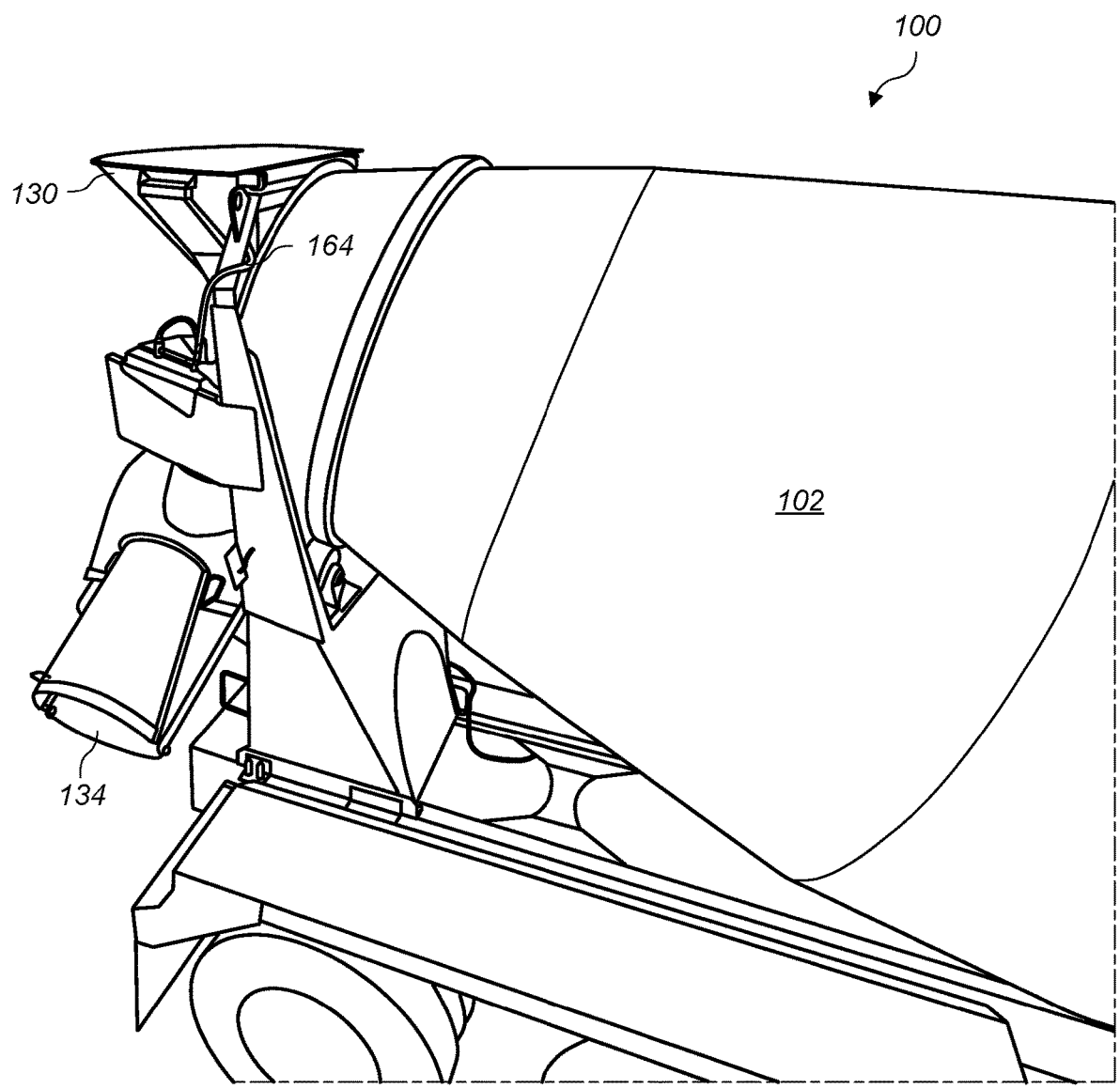
FIG. 8 illustrates a side view of a portion of an embodiment of a concrete mixer truck.

Turning now to FIG. 8, another view of the rear portion of concrete mixer truck 100 is shown. The various elements included in FIG. 8 have been described above, and FIG. 8 shows a different perspective to aid in understanding their arrangement in one embodiment. In particular, FIG. 8 shows the branch of split conduit 164 routed to a set of spray headers on the passenger side of collection hopper 132. Various other embodiments of possible hose routing will be apparent to one of ordinary skill in the art with the benefit of this disclosure.

Figure 9:
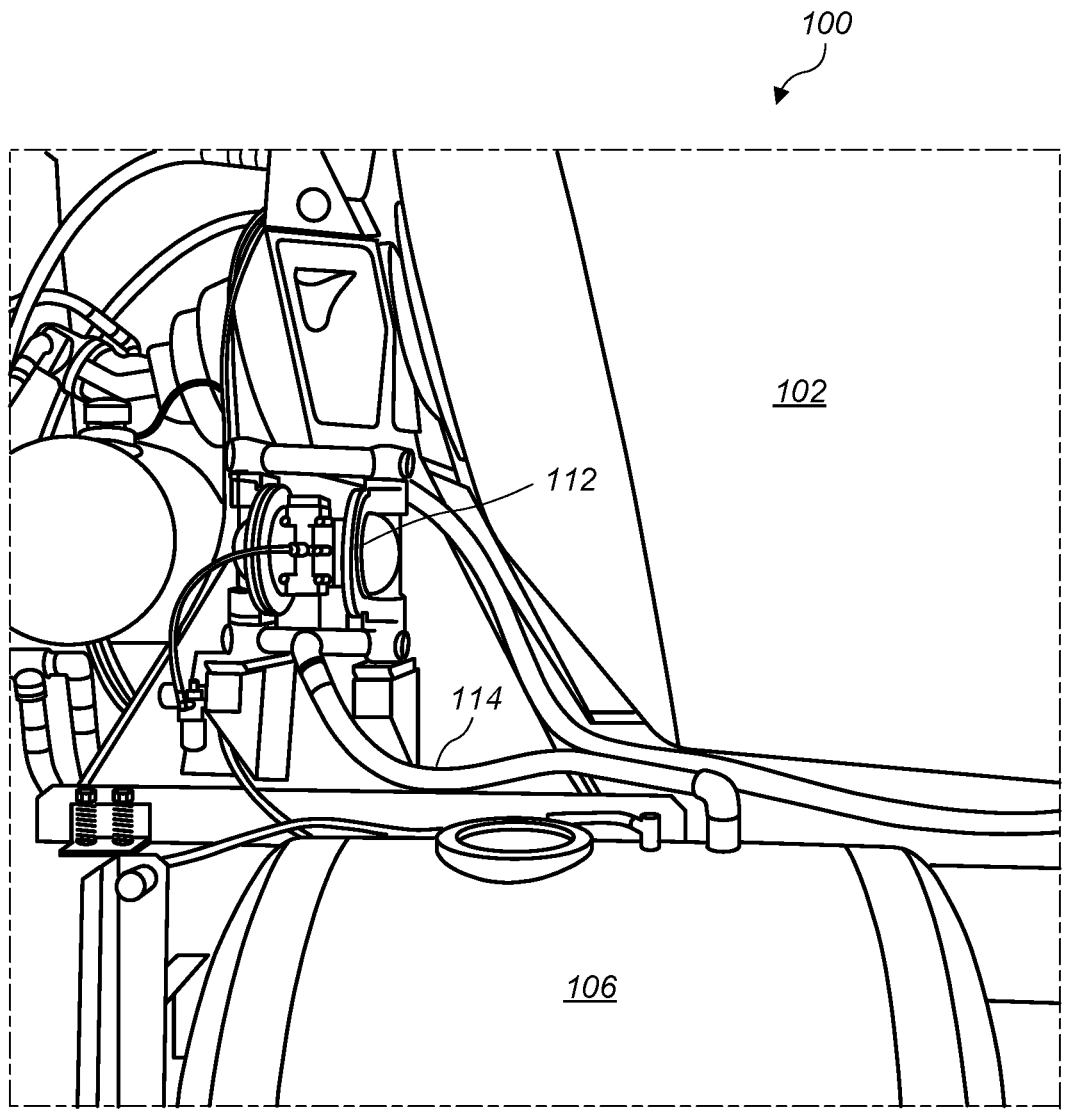
FIG. 9 illustrates one embodiment of a water supply system of a concrete mixer truck.

Turning now to FIG. 9, a close-up view of the water supply system from FIG. 1 is shown. As shown, in this embodiment, the water supply system includes water tank 106, diaphragm pump 112, and various associated water lines 114.

Figure 10B:
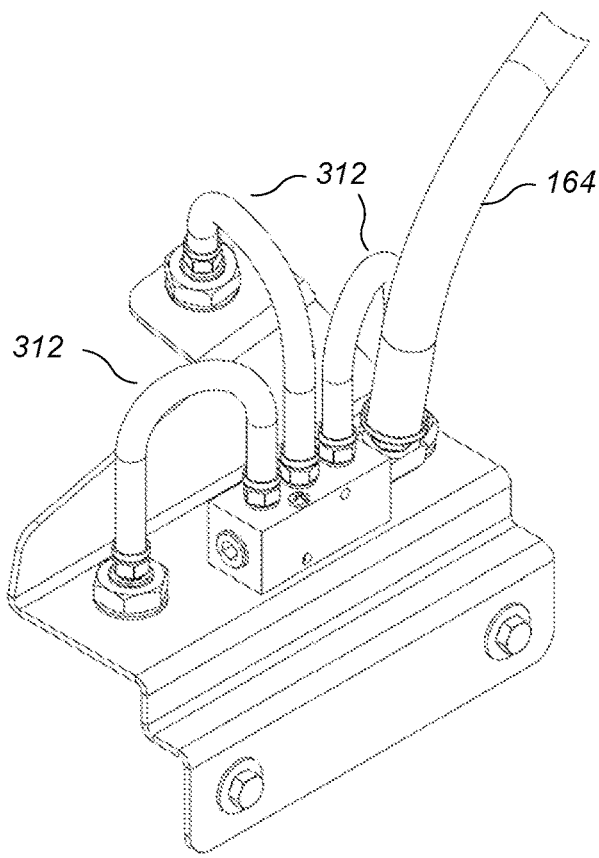
Figure 10C:
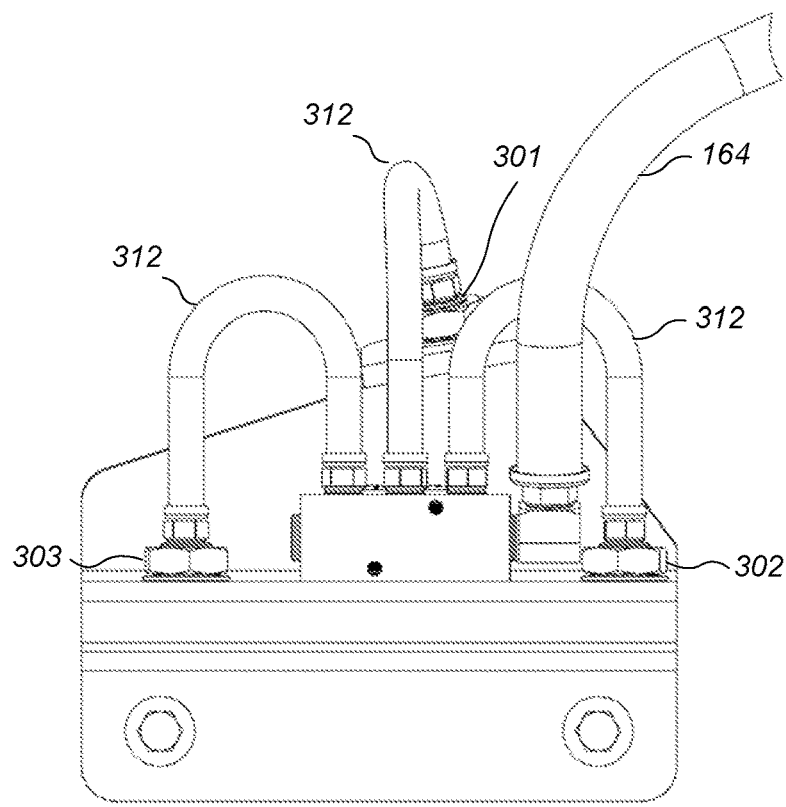
Figure 10D:
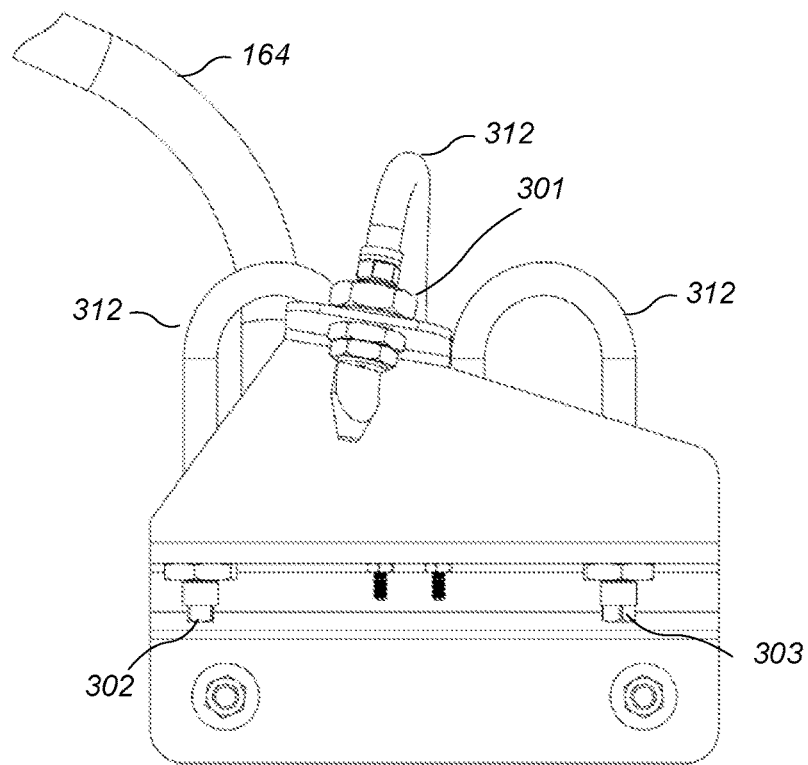
Figure 10E:
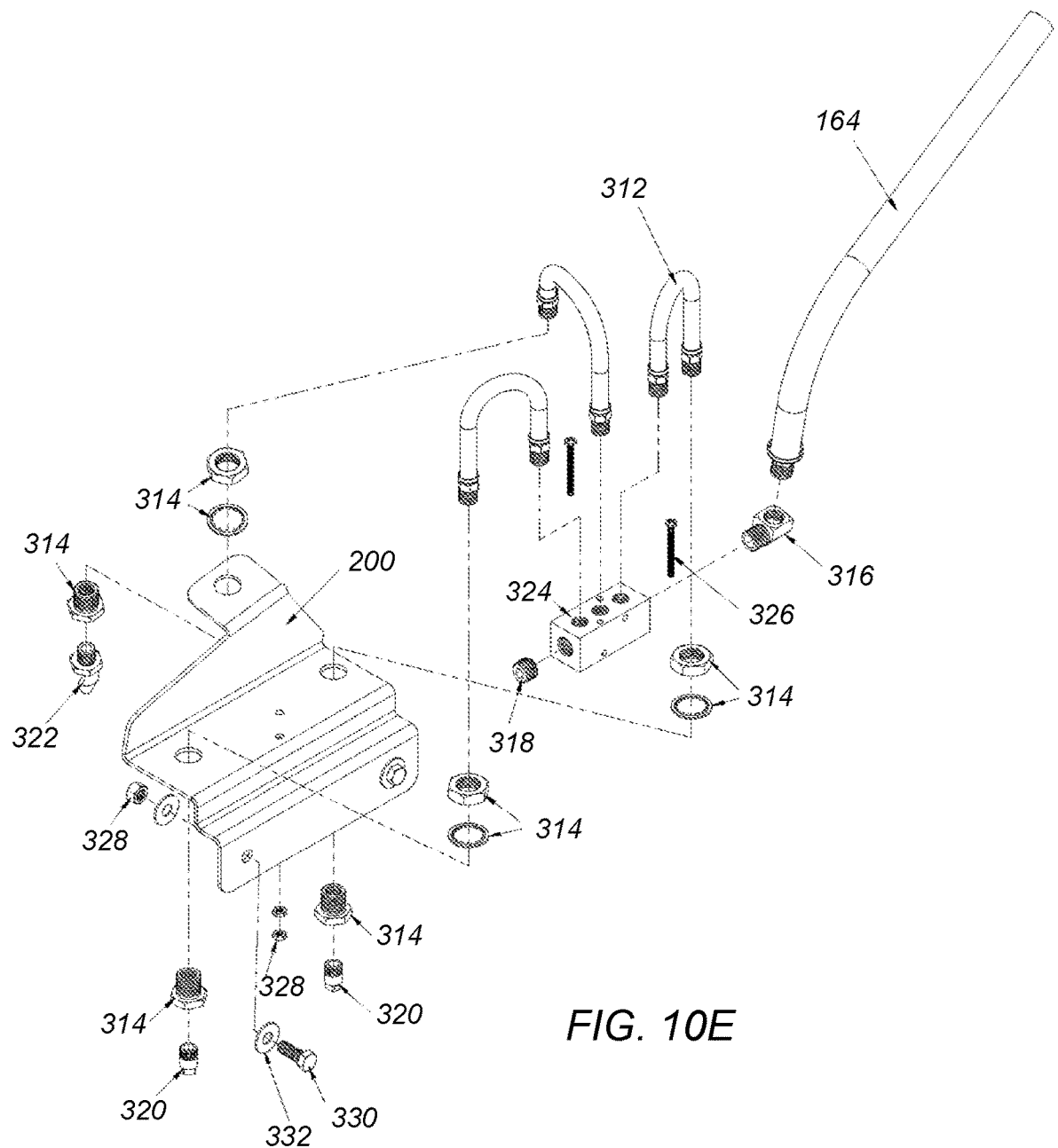

Turning now to FIGS. 10A-E, several views of embodiments of passenger side bracket 200 containing spray headers 301, 302, and 303 is shown. FIG. 10A shows a view of passenger side bracket 200 installed in concrete mixer truck 100. FIG. 10B shows a perspective view of passenger side bracket 200 in isolation. FIG. 10C shows a view of the back side of passenger side bracket 200. FIG. 10D shows a view of the front side of passenger side bracket 200. And FIG. 10E shows an exploded view of passenger side bracket 200. As shown in these figures, spray headers 301-303 are supplied with pressurized water via one of conduits 164, as well as hose assemblies 312.

Spray headers 301-303 are positioned to clean the passenger-side back-end portions of concrete mixer truck 100 (and more specifically, the passenger side of collection hopper 132). The headers depicted in these figures are supplied water by one of conduits 164 coupled to valve 140A. The portion of conduit 164 that feeds headers 301-303 is shown coming from around the drum, where it may have been routed around drum hoop 180 as described above (and as pictured in FIG. 11A below).

As shown, a bottom portion of passenger side bracket 200 is fixedly coupled to a passenger side portion of collection hopper 132. Passenger side bracket 200 extends upward and then makes a substantially 90-degree turn toward the driver's side. This portion of passenger side bracket 200 permits coupling to the depicted guard structure 170 and also includes apertures for headers 302 and 303. Passenger side bracket 200 may be bolted, welded, or coupled in any other suitable manner to collection hopper 132 and/or guard structure 170. Header 302 is configured to dispense water to clean collection hopper 132 and drip ring 137, while header 303 is configured to clean collection hopper 132 (particularly the back right corner thereof).

Passenger side bracket 200 then makes another turn upward, culminating in an angled top portion that houses header 301. Header 301 is positioned to clean an interior rear surface of the passenger side of collection hopper 132. In some embodiments, headers 301-303 are configured to clean only a portion of the truck extending from approximately a center longitudinal axis of the truck toward the passenger side of the truck. In this manner, spray patterns from these headers do not interfere with corresponding headers 304-306 described with reference to FIGS. 11A-E that are positioned to clean driver-side portions of collection hopper 132 and drip ring 137. (An embodiment of some spray patterns from spray headers 301-307 is shown in FIG. 12.) One of ordinary skill in the art with the benefit of this disclosure will understand that in some embodiments, multiple spray headers may be directed toward the same area to clean that area from multiple angles.

FIG. 10E shows an exploded view of passenger side bracket 200 and related parts. The following parts are depicted in one possible arrangement: passenger side bracket 200, conduit 164, hose assemblies 312, brass bulkheads 314, brass elbow 316, brass pipe plug 318, full jet nozzles 320, deflected flat spray nozzle 322, three-port manifold 324, machine screws 326, nuts 328, bolts 330, and washer 332.

Figure 11B:
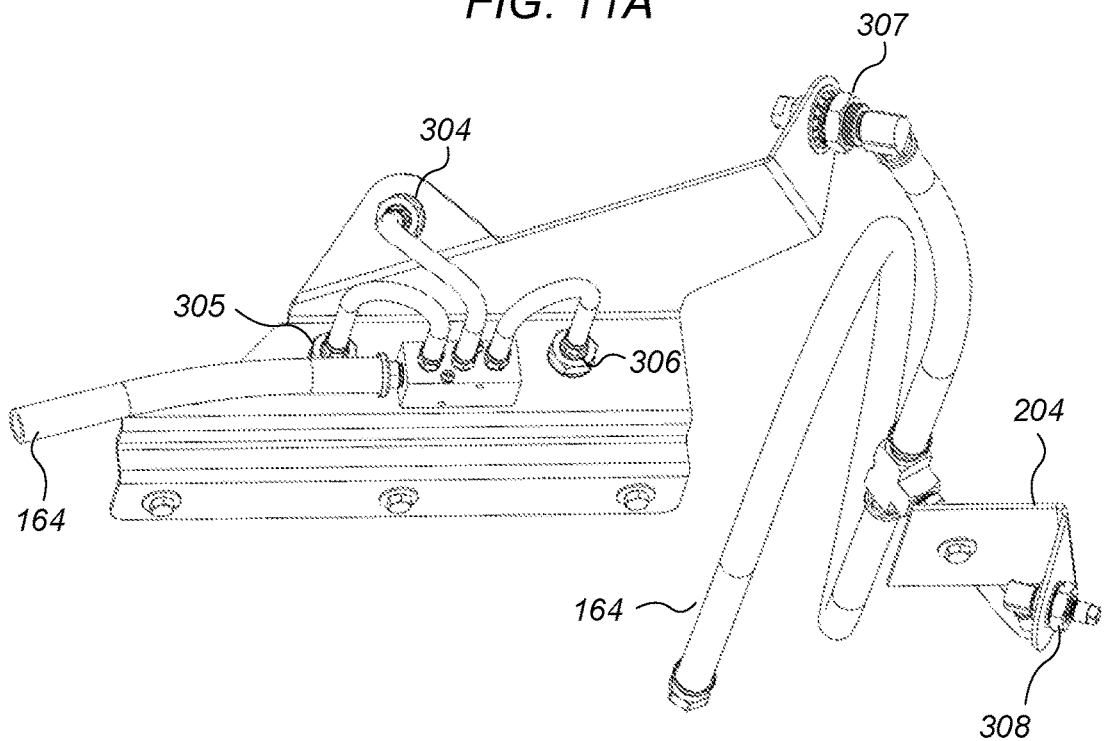
Figure 11C:
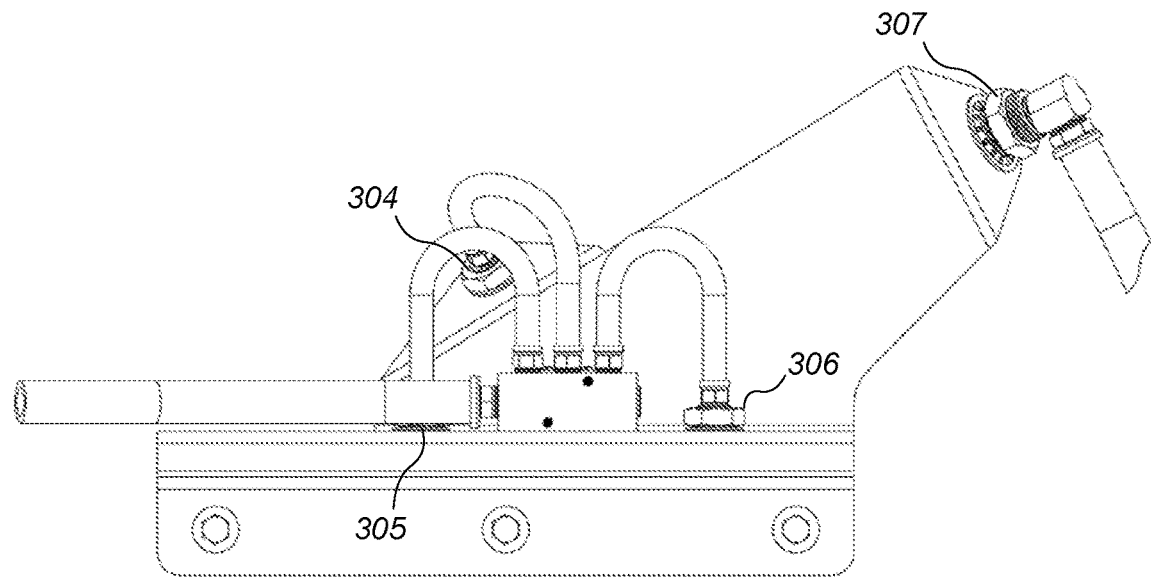
Figure 11D:
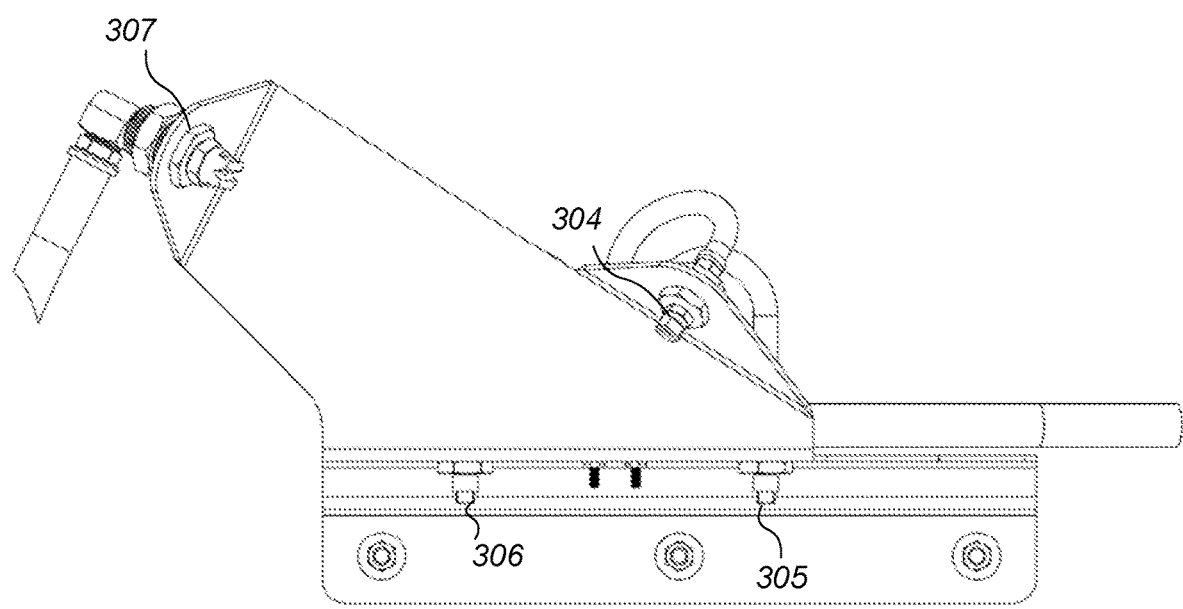
Figure 11E:
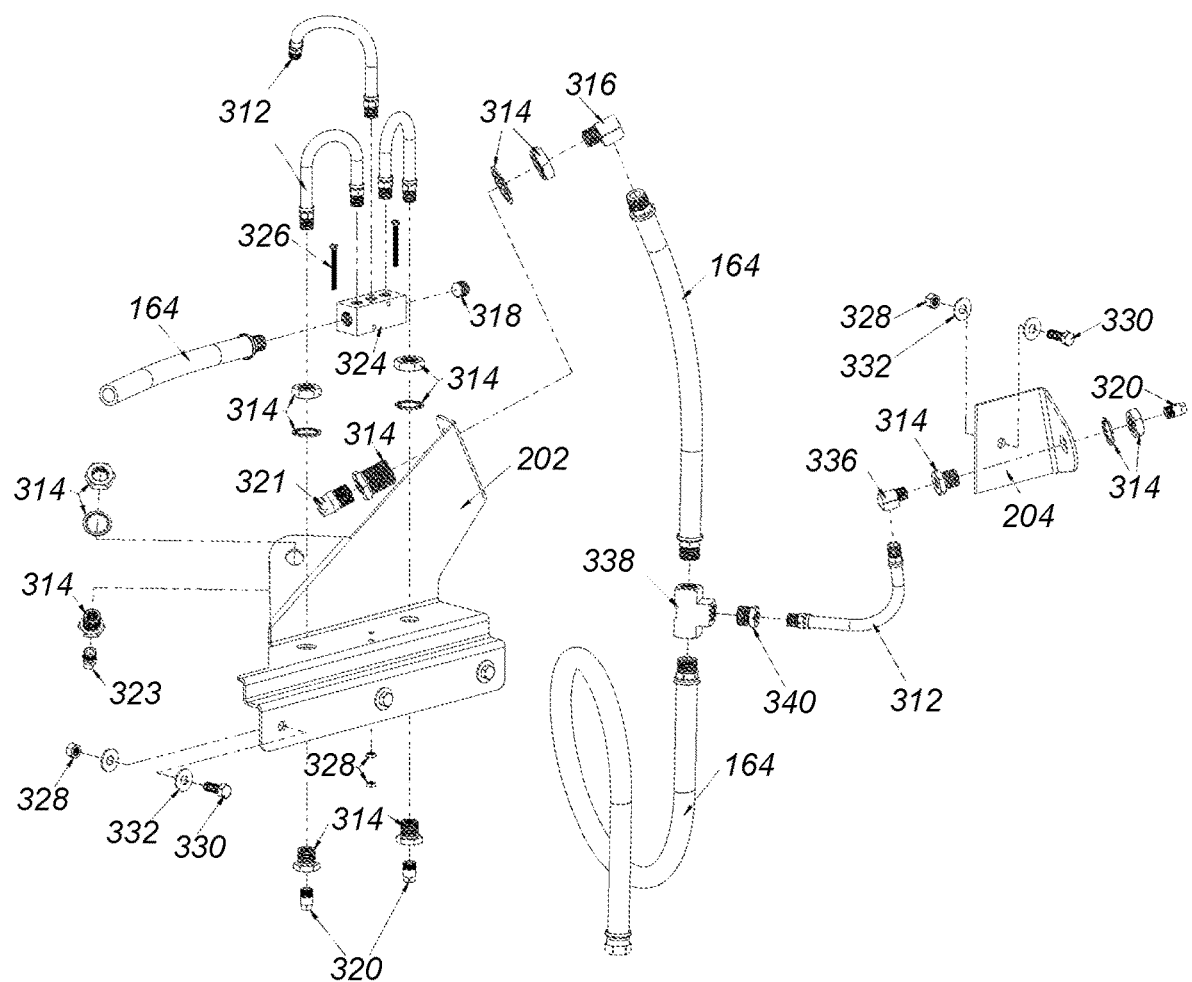
Figure 12:
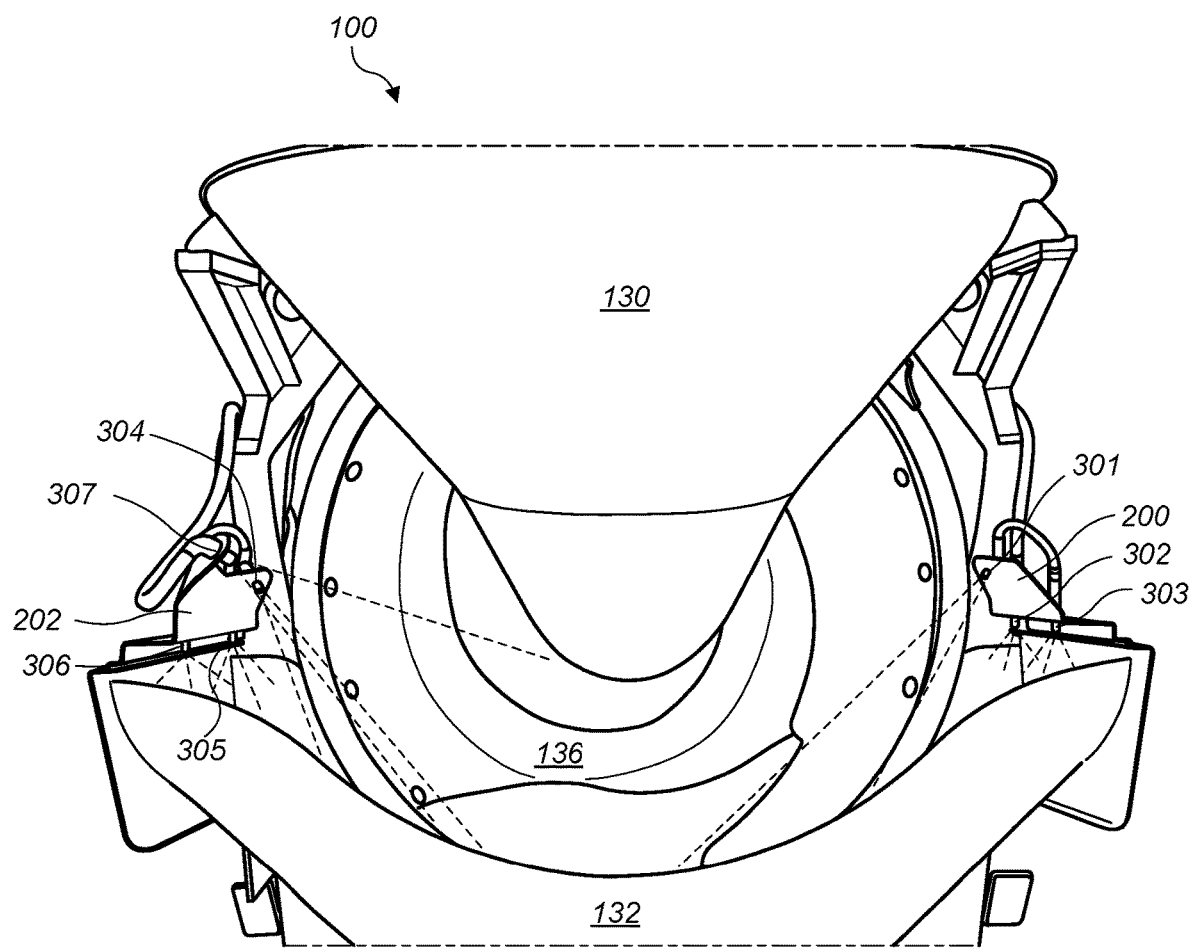
FIG. 12 illustrates a spray pattern according to one embodiment.

Turning now to FIGS. 11A-E, several views of embodiments of driver side bracket 202 and separate bracket 204 are shown, including spray headers 304-308. FIG. 11A shows a view of driver side bracket 202 and separate bracket 204 installed in concrete mixer truck 100. FIG. 11B shows a perspective view of driver side bracket 202 and separate bracket 204 in isolation. FIG. 11C shows a view of the back side of driver side bracket 202. FIG. 11D shows a view of the front side of driver side bracket 202. And FIG. 11E shows an exploded view of driver side bracket 202. The bottom-most conduit 164 shown in FIG. 11A is coupled to valve 140A and provides water for headers 304-306. Header 304 operates in an analogous manner to header 301, cleaning the interior rear surface of the driver side of collection hopper 132. Headers 305 and 306 function similarly to headers 302 and 303. Headers 304-306 are secured to driver side bracket 202, a portion of which is similar in shape to passenger side bracket 200. In particular, in some embodiments, driver side bracket 202 may include a portion that is essentially a mirror image of passenger side bracket 200.

As shown, however, driver side bracket 202 may further include an angled portion that extends upward beyond the portion that is similar to passenger side bracket 200. This portion secures header 307, which is a high-water-volume header angled to dispense water to clean surge blades 135, discharge blades 136, drip ring 137, drum shell 138, etc. Header 307 may also cause water to ricochet from an exterior surface of charge hopper 130, providing further cleaning to the rear portions of drum 102. An additional header 308 may also be used as shown in FIGS. 11A and 11B. In some instances, header 308 may be in other locations; for example, header 308 may be on either side of the truck, and it may or may not be attached to a bracket such as separate bracket 204.

Headers 307 and 308 are both supplied water in this embodiment by valve 140B, which is connected to another one of conduits 164. One portion of the conduit 164 from valve 140B can be seen at the bottom of FIG. 11A, just above the conduit that supplies water to headers 304-306. (Distribution hoses may also be used for some headers, similar to hose assemblies 312 shown in FIGS. 10A-10D.) Another portion of conduit 164 can be seen feeding header 308, which is secured to separate bracket 204. Header 308 is positioned to clean the drip ring. As with passenger side bracket 200, driver side bracket 202 in this embodiment may also be covered by a metallic guard structure 170 configured to protect headers 304-307. Various embodiments may implement only a portion of the pictured spray headers as needed for a particular mixer configuration, or may implement different arrangements of such spray headers, etc. In one embodiment, for example, one or more headers may be omitted, and larger headers may be used in one or more nearby positions. For example, header 308 may be omitted in one embodiment, and header 307 may be a larger header to maintain cleaning efficiency.

FIG. 11E shows an exploded view of driver side bracket 202, separate bracket 204, and related parts. The following parts are depicted in one possible arrangement: driver side bracket 202, separate bracket 204, conduit 164, hose assemblies 312, brass bulkheads 314, brass elbow 316, brass pipe plug 318, full jet nozzles 320, v-jet nozzle 321, flat fan spray nozzle 323, three-port manifold 324, machine screws 326, nuts 328, bolts 330, washer 332, brass elbow 336, brass tee 338, and brass reducer bushing 340.

Turning now to FIG. 12, an embodiment illustrating spray patterns from the spray headers attached to passenger side bracket 200 and driver side bracket 202 is shown. Guard structures 170 are omitted in this figure for the sake of clarity. (Guard structures 170 may be removable or permanently attached in different embodiments.)

As shown in FIG. 12, headers 301-303 are coupled to passenger side bracket 200 and generally provide cleaning to the passenger side of collection hopper 132 and drip ring 137. Headers 304-306 are coupled to driver side bracket 202 and generally provide cleaning to the passenger side of collection hopper 132 and drip ring 137. Header 307 is also coupled to driver side bracket 202 and generally provides cleaning to the middle of discharge blades 136. Header 307 may also cause water to ricochet from an exterior surface of charge hopper 130, providing further cleaning to the rear portions of drum 102. Header 308 is omitted in this embodiment.

One skilled in the art will appreciate various possible advantages of the disclosed embodiments. If a truck can return to the plant to receive another load more quickly, the concrete producer can deliver more loads per day and improve profitability, thereby reducing costs. Further, if an operator can reduce or eliminate the number of times he or she has to climb the ladder to clean the truck, the number of falling, stumbling, and tripping injuries will be reduced or eliminated. The disclosed cleaning system also has various salutary environmental impacts, including reducing the volume of water being used and reducing the engine idle time on the truck. Additionally, more loads per day per truck will reduce the number of trucks required to deliver the same amount of concrete each day. Still further, the use of the disclosed cleaning system may allow the owners of the concrete mixer truck to remove the ladder and platform assembly altogether. Such a removal could save well over 200 pounds of weight from the mixer. Concrete trucks are highly regulated by local weight enforcement officers for total weight, weight per axle, number of axles, and distance between axles. Engineers work tirelessly to find ways to make trucks and mixers lighter in order to gain compliance and improve legal payload. Finally, mixer operators would appreciate the convenience of automating a time-consuming, monotonous task. Moreover, because some mixer operators receive bonuses for carrying more loads, wages may improve if an operator can carry more loads in the same shift. In short, the disclosed cleaning system can lead to increased fleet efficiency, safety, and morale, as well as reduced environmental impact and truck weight.

According to some embodiments, a cleaning system according to this disclosure may be distributed as a modular "kit" that may be retrofit onto an existing concrete mixer truck. One of ordinary skill in the art with the benefit of this disclosure will understand the various modifications that may be made to, for example, passenger side bracket 200 and driver side bracket 202, to allow them to be fit to a desired truck.

In some embodiments, the depicted valves 140A and 140B are configured to be operated manually to initiate automated cleaning of rear-end portions of the truck. In other embodiments, these valves (and optionally, valve 140C or any similar valve used for water injection into the drum) may be operated automatically by a computing device such as a microcontroller electrically coupled to the valves. For example, such a computing device could be used to operate a solenoid to actuate the valves; alternatively, the computing device could be coupled to the air system of the concrete mixer truck, and the valves could be pneumatically actuated. One example of such a computing device is described below with reference to FIG. 15. The electrical coupling between such a computing device and valves 140 may be hardwired or wireless. Alternately, the computing device may be connected to the one or more valves via a communication bus.

One example of a communication bus between the computing device and valves 140 may operate according to a CAN (controller area network) bus protocol. CAN bus is a vehicle bus standard designed to allow microcontrollers and devices to communicate with each other, for example in applications without a host computer. CAN bus is a message-based protocol, designed originally for multiplex electrical wiring within automobiles, and it may be well-suited for coupling a computing device to valves 140.

In one embodiment, the computing device may be programmable to carry out a specified washing protocol. A washing protocol may specify what headers are to be turned on at what times, and may also specify a duration or a water volume amount for a particular cleaning cycle. This may provide additional benefits. For example, by keeping track of how much water has flowed into the drum, an operator might opt to leave that water in the drum and incorporate it into the next batch of concrete rather than emptying it out. This capability may decrease water use, decrease waste cleanup, and increase efficiency.

In some embodiments, a washing protocol may specify that different groups of headers are to be turned on at different times by different valves. (Such embodiments may provide additional washing pressure, by limiting the flow rate to only a subset of headers at a single time.) In other embodiments, a washing protocol may specify that all headers are turned on at once in a single washing cycle. In some of these embodiments, the computing device may also be configured to turn off the one or more valves when a washing protocol (or a portion thereof) is complete. In some embodiments, a valve may be actuated that drains the water lines after a washing protocol has been completed (e.g., to prevent issues with water freezing in the lines). For example, such a washing protocol may be programmed into the computing device permanently, or it may be operator-configurable. For example, if an operator notices that a particular portion of a concrete mixer truck is not being cleaned adequately by a built-in washing protocol, it may be appropriate to increase an amount of time during which the corresponding spray header(s) are operated. In some cases, different washing protocols may also be selected for different types of concrete, or for any other desired purpose. Programming of the computing device may, in various embodiments, be accomplished via a console permanently coupled to a concrete mixer truck, via a separate console temporarily coupled to the concrete mixer truck, etc. For example, in some embodiments, a separate console may connect wirelessly or via a wired connection to the computing device that controls the washing protocol.

In some embodiments, other functions on a concrete mixer truck that are not typically associated with washing may also be automated according to a washing protocol. For example, a washing protocol may include specified rotations of the drum of the truck before, during, or after washing. For example, an embodiment of a washing protocol might specify that the drum should rotate continuously during the washing at a specified speed, or it might specify that the drum should rotate to a given orientation before, during, or after the washing, etc. Further, in some embodiments, a washing protocol may include various types of warnings (such as warning lights, audible alarms, etc.) that may notify personnel that washing is in process or is about to commence.

In some embodiments, a washing protocol may employ one or more safety interlocks. For example, a protocol may specify that the concrete mixer truck must be in neutral gear, and/or that the parking brake must be applied. If either or both of these conditions are not satisfied, the washing protocol may not commence.

In some embodiments, one or more cameras may further be coupled to the computing device to provide pictures or video of the cleaning process. For example, a video screen may be included within the cab of a concrete mixer truck so that an operator can monitor the cleaning process. Such cameras may be coupled via a CAN bus protocol, or some other electronic coupling method. In some embodiments, signals from such cameras may be transmitted to the cab (and/or some other location) wirelessly.

Figure 13A:
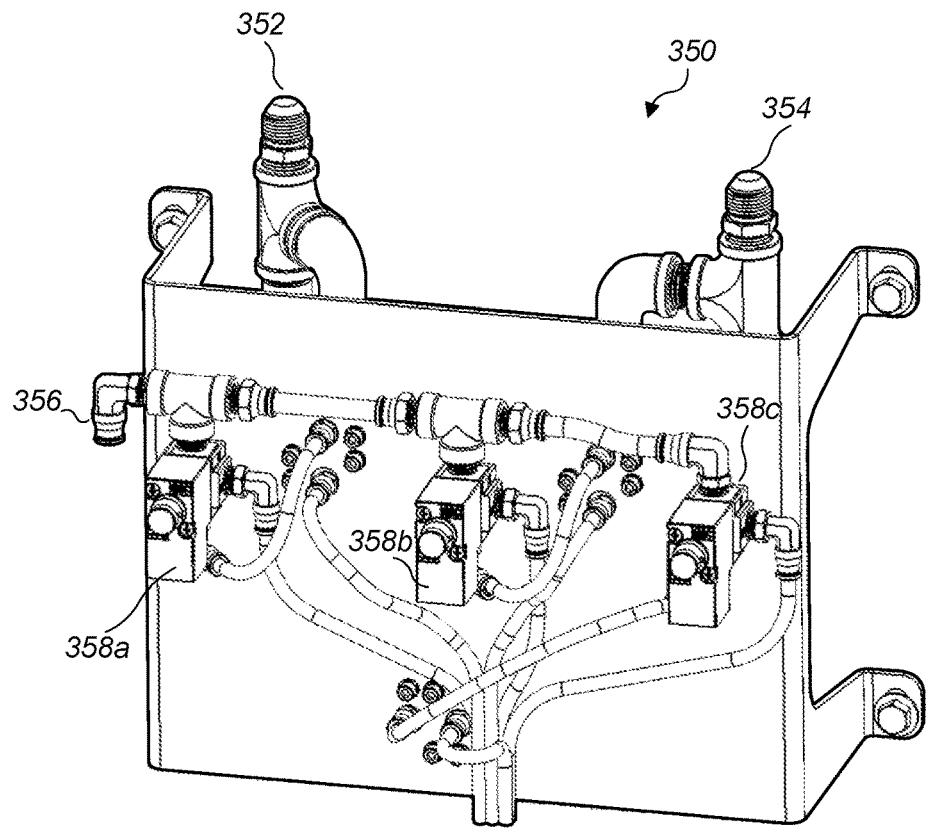
FIGS. 13A-13B illustrate a valve assembly according to one embodiment.
Figure 13B:
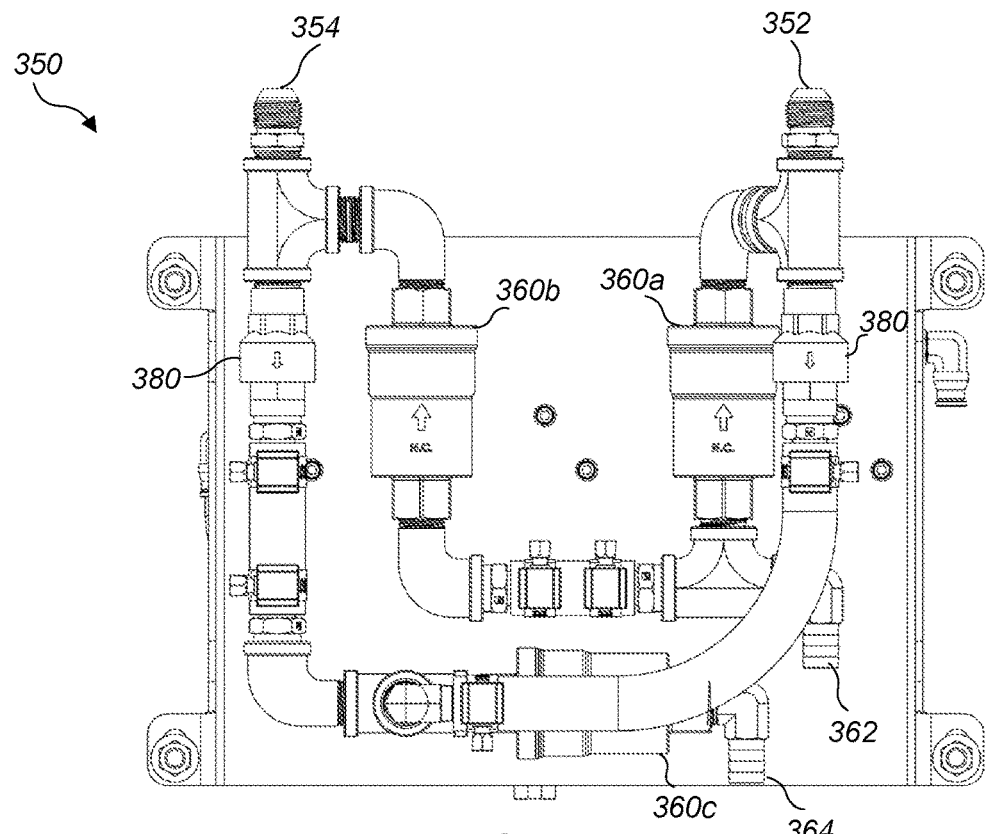

Turning now to FIGS. 13A-13B, an example of valve assembly 350 according to one embodiment is shown. FIG. 13A shows the front side of valve assembly 350, including mainly pneumatic air valves; FIG. 13B shows the back side of valve assembly 350, including mainly pneumatically actuated water valves. Valve assembly 350 may be used to allow a computing system to pneumatically control the operation of various water valves by electronically controlling the operation of corresponding pneumatic air valves.

As shown in FIG. 13A, pressurized air is supplied via air supply 356. The pressurized air is routed to air valves 358a (Air Valve #1), 358b (Air Valve #2), and 358c (Air Valve #3). Air valves 358a, 358b, and 358c are electronically actuated air valves that may be controlled via an onboard computing system (e.g., via a CAN bus protocol) in accordance with a selected washing protocol.

The pneumatic outputs of air valves 358a, 358b, and 358c are routed through valve assembly 350 to respective water valves 360a (Water Valve #1), 360b (Water Valve #2), and 360c (Water Valve #3), visible in FIG. 13B. Water valves 360a, 360b, and 360c receive pressurized water via water inlet 362. Output 352 from water valve 360a is used to direct water to spray headers located at the drum blade and drip ring, and output 354 from water valve 360b is used to direct water to spray headers located at the collection hopper in this embodiment. Water valve 360c is a dump valve that is used to drain the various water lines through drain 364 back to the water tank after a cleaning cycle has been completed. One-way check valves 380 are used to prevent water from flowing in the wrong direction. This arrangement of valves is discussed in more detail in schematic form in FIG. 14.

Figure 14:
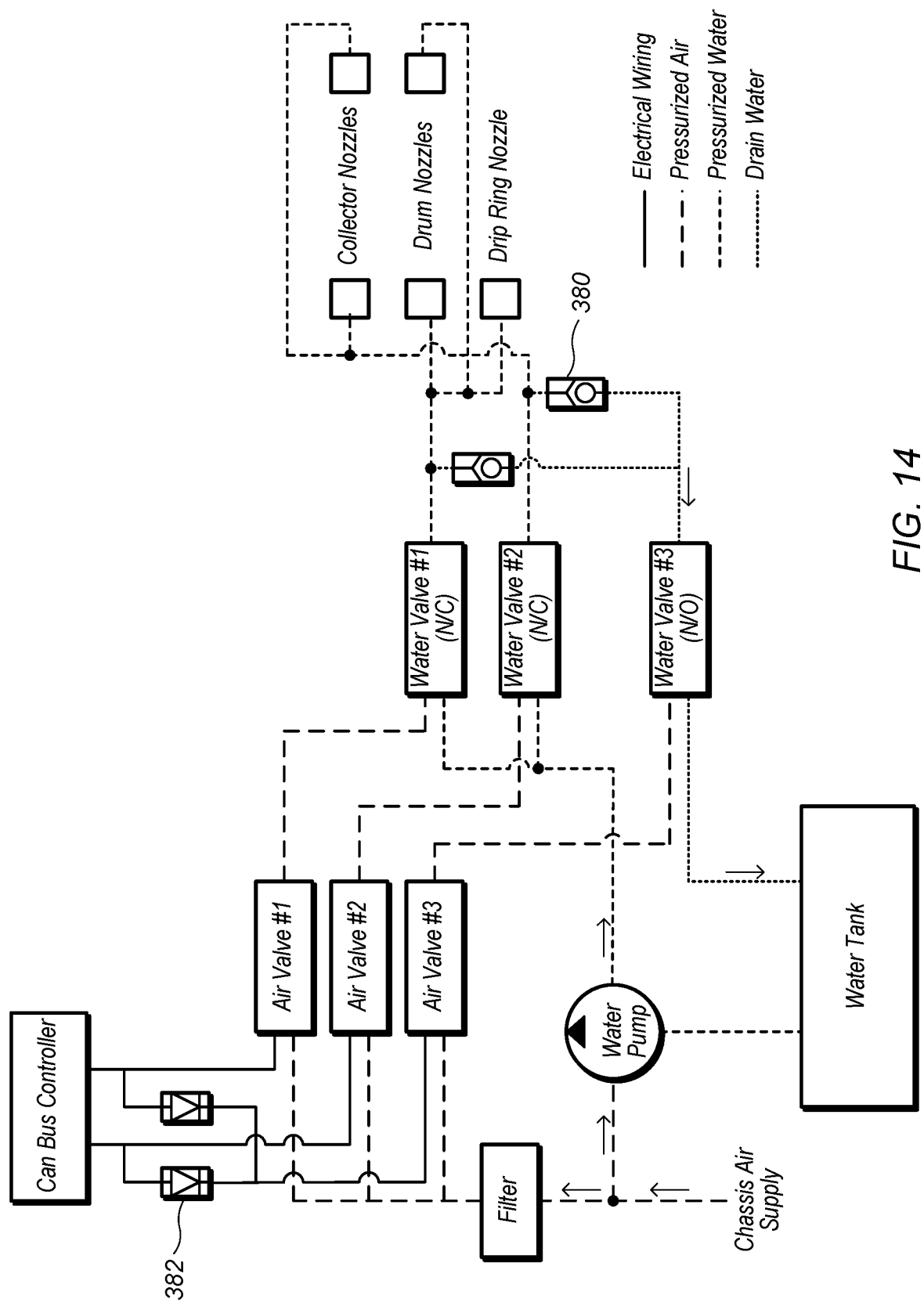
FIG. 14 illustrates a schematic of a control architecture according to one embodiment.

Turning now to FIG. 14, a schematic is shown that depicts a control architecture according to one embodiment. As shown, three air valves and three water valves may be used to control this embodiment. One of ordinary skill in the art with the benefit of this disclosure will understand that other numbers of air and water valves may be used in other embodiments.

FIG. 14 depicts various types of connections between components. As shown, electrical wiring, pressurized air lines, pressurized water lines, and drain water lines are all shown with different line styles. A pneumatically powered water pump draws water from the water tank, pressurizes the water, and supplies it to Water Valves #1 and #2.

Air Valves #1, #2, and #3 may be electronically operated solenoid valves. In normal (not energized) state, they are all closed. Water Valves #1, #2, and #3 may be pneumatically operated On/Off control valves coupled respectively to Air Valves #1, #2, and #3. In normal (not actuated) state, Water Valves #1 and #2 are closed; Water Valve #3 is open. Water Valves #1 and #2 are used to control spray headers used for cleaning, wherein Water Valve #3 is a dump valve that is used to drain the water lines after a cleaning cycle has been completed.

As shown, the two electrical outputs from the Can Bus Controller are respectively operable to actuate Air Valves #1 and #3, or Air Valves #2 and #3. Further, one-way check valves 380 are installed to prevent water from back-flowing from the water tank to the various nozzles. Diodes 382 are positioned to prevent signals from Air Valve #3 from travelling back to Air Valve #1 or #2.

A brief overview of the connections shown in FIG. 14 has now been supplied. Additional discussion is provided below regarding which air and water valves may be actuated at selected times, according to various washing protocols.

Figure 15:
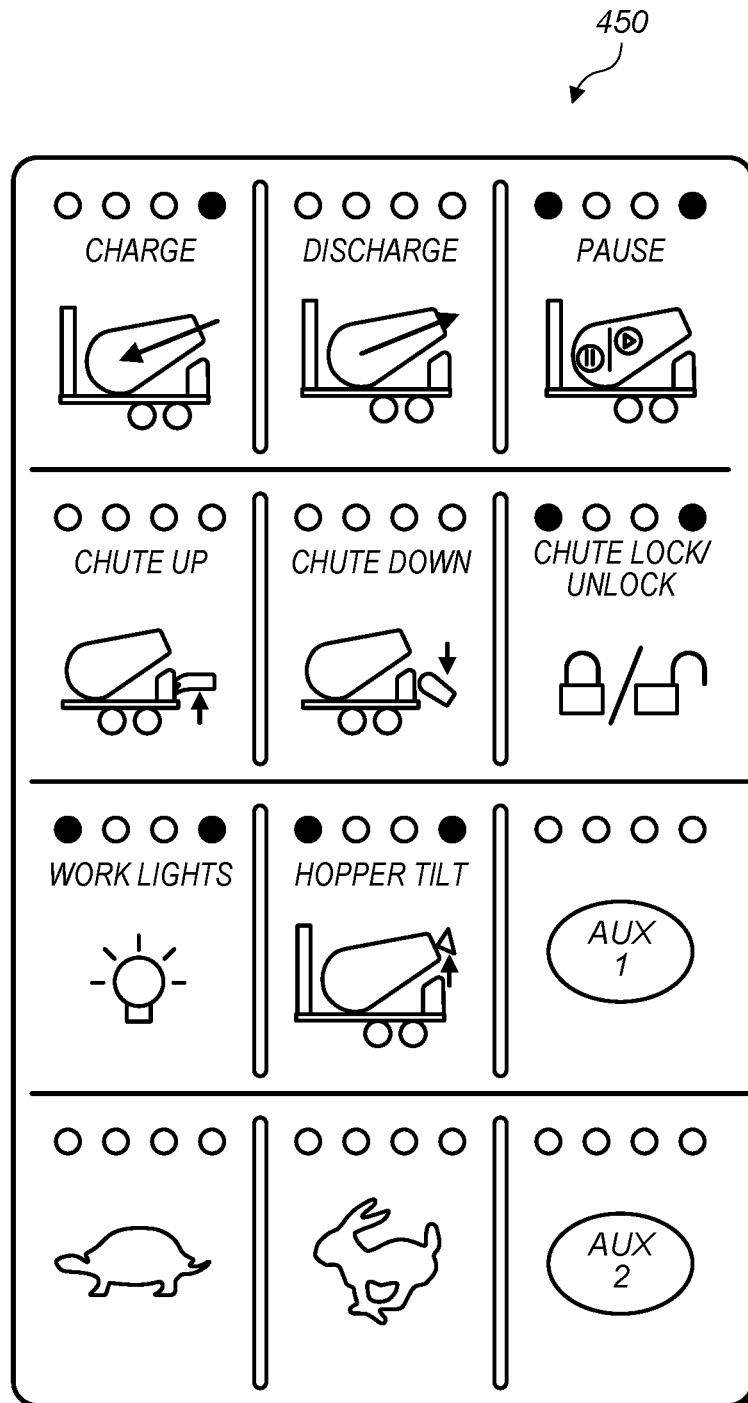
FIG. 15 illustrates a control panel according to one embodiment.

Turning briefly to FIG. 15, an example of a control panel 450 according to the present disclosure is shown. Control panel may be located near the rear portion of a concrete mixer truck in some embodiments, or in the cab in other embodiments. Various functions, including both cleaning and non-cleaning functions, may be activated from control panel 450.

For example, as shown, the drum rotation direction may be selected for either charge or discharge mode. Further, drum rotation may be paused. Chute controls (up, down, lock, and unlock) are also provided via control panel 450. Lights may be turned on or off, the hopper may be tilted, and the speed of the engine may be adjusted. Finally, various cleaning functionalities may be activated via the AUX 1 and AUX 2 buttons. One of ordinary skill in the art with the benefit of this disclosure will understand that various other control panels may also be used to control such functionalities.

In some embodiments, both "primary wash cycles" and "secondary wash cycles" may be available according to this disclosure. The term "primary wash cycle" is generally used to refer to washing protocols that clean portions of the back-end of the concrete mixer truck, such as the drum blades, drip ring, collection hopper etc., which cannot effectively be cleaned from the ground level but would require the operator to climb a ladder to clean. The term "secondary wash cycle" is used to refer to washing protocols that clean the cleaning system itself by flushing the spray headers and wetting the collection hopper after loading materials into the drum to be mixed into concrete. The secondary wash cycle may operate in very short blasts of water designed to make the overall system more effective and easier to maintain.

Additional wash cycles are available in some embodiments to clean other mixer components such as the charge hopper, or other areas that commonly accumulate concrete buildup.

A primary wash cycle may be broken down into separate portions in order to increase cleaning efficiency by increasing the pressure available at the spray headers. That is, by turning on only a subset of spray headers, the available water pressure may be greater. In one embodiment, a primary wash cycle may be broken down into primary wash cycle #1, which cleans the drum blades and drip ring, and primary wash cycle #2, which cleans the collection hopper.

A secondary wash cycle may operate, for example, by actuating valves to create a brief blast of water from the different spray headers. For example, a secondary wash cycle might be broken down into secondary wash cycle #1, which clears the drum blades and drip ring nozzles of any dust build up that has accumulated during the loading process, and secondary wash cycle #2, which clears the collection hopper nozzles (or other portions of the mixer that regularly need cleaning, such as the charge hopper) of any dust build up. Typically, safety interlocks may be imposed on primary wash cycles, but they may be omitted in some embodiments for secondary wash cycles.

In some embodiments, certain wash cycles (e.g., secondary wash cycles) may be initiated without human intervention and without being explicitly requested. For example, a computing device may detect that a loading functionality has been activated and thus deduce that the drum has been loaded; after this detection, the computing device might initiate a selected washing protocol consistent with a loaded drum, such as clearing the nozzles of the cleaning system and/or washing the charge hopper. For example, such a washing protocol may be initiated based upon a detection that the parking brake is applied, but without a specific instruction from an operator.

Turning back to FIG. 14, to initiate a primary wash cycle, a user may issue a primary wash command and select a rotation direction for the drum. (For example, the drum may be operated in either a discharge mode or a mixing mode during the wash cycle.) The CAN Bus controller may then check with the truck engine control module (ECM) for safety interlocks. For example, it may be verified that the truck is in neutral, and that the parking brake is applied.

Further, if the truck's engine is operating at too high or too low an RPM, it may automatically be brought to a selected RPM speed, and the drum may start rotating at a selected rotation speed in the desired direction. In some embodiments, the washing protocol may specify the RPM speed and/or the drum speed; in other embodiments, the RPM speed and/or the drum speed may be dependent upon the particular hardware of the truck. Once the drum reaches the correct speed, the controller may engage the primary wash cycle by simultaneously sending electrical signals to both Air Valves #1 and #3. Air Valve #1 sends pressurized air to Water Valve #1, opening that valve to allow pressurized water to flow to the spray headers at the drum blade and drip ring. Air Valve #3 sends pressurized air to Water Valve #3, closing that valve to prevent water from flowing back into the water tank. A one-way check valve also blocks water from back-feeding into the collection hopper spray headers.

Primary wash cycle #1 may last for some 20 seconds. At the end of primary wash cycle #1, a brief delay of some 5 seconds may be included. After this delay, primary wash cycle #2 is automatically initiated. During primary wash cycle #2, the controller simultaneously sends electrical signals to both Air Valves #2 and #3. Air Valve #2 sends pressurized air to Water Valve #2, opening that valve to allow pressurized water to flow the spray headers at the collection hopper. Air Valve #3, as above, sends pressurized air to Water Valve #3, closing that valve to prevent water flow back to the water tank. A one-way check valve also blocks water from back-feeding into the drum blade and drip ring lines. Primary wash cycle #2 may last for some 20 seconds. At the end of primary wash cycle #2, the system may go back into standby state, and any remaining water in the nozzle lines may drain back to the water tank through Water Valve #3, which opens in the absence of pressure from Air Valve #3.

To initiate a secondary wash cycle, a user may issue a secondary wash command. The CAN Bus controller may then send electrical signals to both Air Valves #1 and #3. Air Valve #1 sends pressurized air to Water Valve #1, opening that valve to allow pressurized water to flow to the spray headers at the drum blades and drip ring. Air Valve #3 sends pressurized air to Water Valve #3, closing that valve to prevent water from flowing back to the water tank. A one-way check valve also blocks water from back-feeding into the collection hopper lines. Secondary wash cycle #1 may last for some two seconds. During secondary wash cycle #2, the controller simultaneously sends electrical signals to both Air Valves #2 and #3. Air Valve #2 sends pressurized air to Water Valve #2, opening that valve to allow pressurized water to flow to the spray headers at the collection hopper. Air Valve #3 sends pressurized air to Water Valve #3, closing that valve to prevent water from flowing back to the water tank. A one-way check valve also blocks water from back-feeding into the drum blade and drip ring lines. Secondary wash cycle #2 may last for some two seconds. At the end of secondary wash cycle #2, the system may go back into standby state, and any remaining water in the lines may drain back to the water tank through Water Valve #3, which opens in the absence of pressure from Air Valve #3.

The embodiments described above are configured to automatically clean the collection hopper, a rear portion of the mixing drum, or both. In other embodiments, additional conduits and headers may be deployed to clean other areas of the truck. For example, in other embodiments, the disclosed cleaning system may be configured to clean the charge hopper or any of the one or more chutes in the discharge assembly.

Certain example process flows in accordance with this disclosure are now presented.

Example Process Flows

Turning now to FIG. 16, an example of a process flow 500 in accordance with this disclosure is shown. Flow begins at step 502.

At step 502, an in-transit concrete mixer truck is operated to dispense concrete. (The reference to an "in-transit" concrete mixer truck refers to the fact that the truck is operable to mix concrete while in transit.) For example, the in-transit concrete mixer truck may prepare concrete while in transit to a destination, and then dispense the concrete with discharge blades such as discharge blade 136. Flow proceeds to step 504.

At step 504, after dispensing the concrete, a cleaning system coupled to the truck is operated to clean concrete residue from one or more back-end portions of the truck. At step 504, it is noted that the cleaning system includes a water delivery system configured to deliver pressurized water via one or more conduits to a plurality of spray headers coupled to the truck, wherein the cleaning system further includes one or more valves operable to control the release of pressurized water from the plurality of spray headers to automatically clean one or more back-end portions of the truck. Flow ends at step 504.

Turning now to FIG. 17, another example of a process flow 520 according to this disclosure is shown. Flow begins at step 522.

At step 522, an in-transit concrete mixer truck is operated to dispense concrete. As above, the in-transit concrete mixer truck may prepare concrete while in transit to a destination, and then dispense the concrete with discharge blades such as discharge blade 136. Flow proceeds to step 524.

At step 524, after dispensing the concrete, an operator or computer instructs a cleaning system coupled to the truck to initiate a process to clean concrete residue from the truck. At step 524, it is also noted that the cleaning system includes a water delivery system configured to deliver pressurized water via one or more conduits to one or more spray headers coupled to the truck, wherein the cleaning system further includes a computing device electrically coupled to one or more valves and configured to automatically operate the one or more valves to control the release of pressurized water from the one or more spray headers to clean concrete residue from one or more back-end portions of the truck. Flow ends at step 524. An example computing system that may be used to implement portions of this disclosure is now presented. For example, such a computing system may be used to automate cleaning via a programmed washing protocol as described above.

Example Computing System

Various operations described herein may be implemented by a computing device configured to execute program instructions that specify the operations. Similarly, various operations may be performed by circuitry desired or configured to perform the operations. In some embodiments, a non-transitory computer-readable medium has program instructions stored thereon that are capable of causing various operations described herein. As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Figure 18:
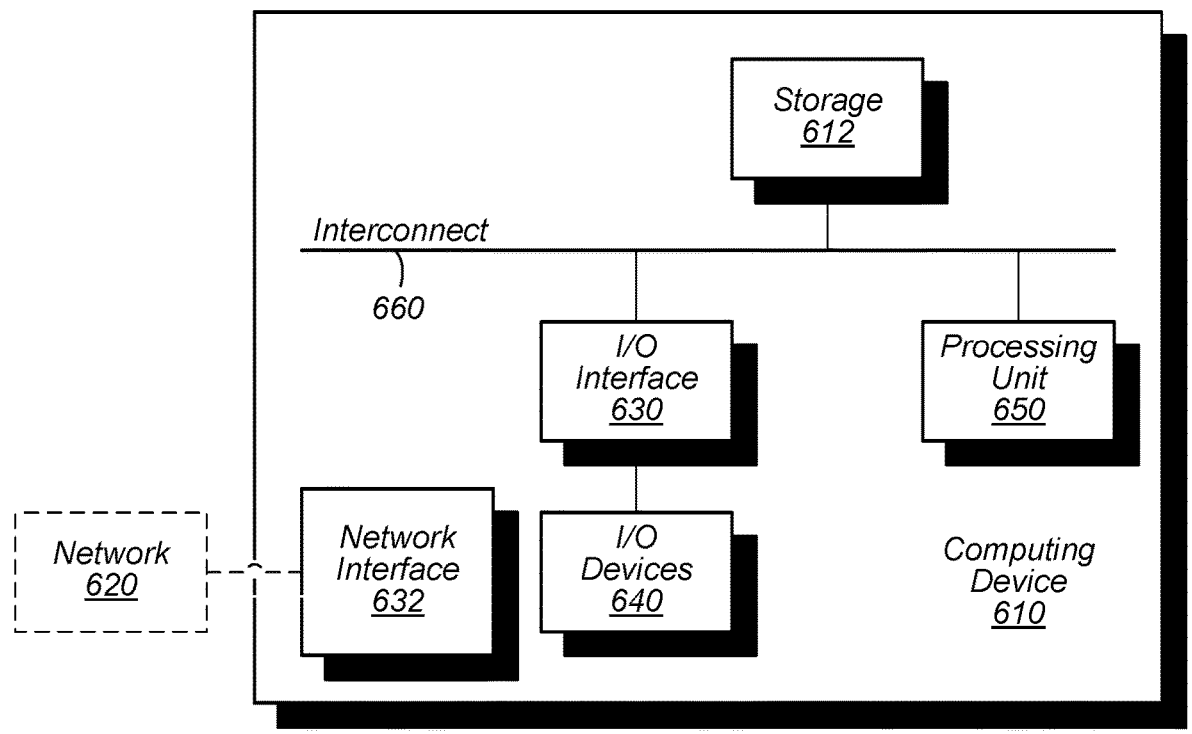
FIG. 18 illustrates an example of a computing system that may be used in accordance with this disclosure.

Turning now to FIG. 18, a block diagram of a computing device (which may also be referred to as a computing system) 610 is depicted, according to some embodiments. Computing device 610 may be used to implement various portions of this disclosure. Computing device 610 is one example of a device that may be used as a mobile device, a server computing system, a client computing system, an embedded computing system, or any other computing system implementing portions of this disclosure.

Computing device 610 may be any suitable type of device, including, but not limited to, a personal computer system, laptop or notebook computer, mobile phone, microcontroller, network computer, etc. As shown, computing device 610 includes processing unit 650, storage subsystem 612, input/output (I/O) interface 630 coupled via interconnect 660 (e.g., a system bus). I/O interface 630 may be coupled to one or more I/O devices 640. Computing device 610 further includes network interface 632, which may be coupled to network 620 for communications with, for example, other computing devices.

As described above, processing unit 650 includes one or more processors. In some embodiments, processing unit 650 includes one or more coprocessor units. In some embodiments, multiple instances of processing unit 650 may be coupled to interconnect 660. Processing unit 650 (or each processor within processing unit 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 612 may consist solely of volatile memory in some embodiments. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In some embodiments, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Example Embodiments

A numbered list of example embodiments follows. Although they are written in claim-like language, these embodiments are not the claims of this application (which follow in a separate section), but are merely a number of embodiments that are specifically contemplated and disclosed herein. This list should be taken as exemplary, not exclusive.

1. A concrete mixer truck, comprising: a chassis assembly that includes a cab and a frame coupled to a rear portion of the cab; a mixing drum coupled to the chassis assembly, wherein the mixing drum is configured to mix input ingredients to produce concrete and discharge the concrete; a collection hopper positioned to receive concrete from the mixing drum and configured to direct the received concrete; a water tank; a water delivery system coupled to the water tank, wherein the water delivery system is configured to remain in place when the concrete mixer truck is in transit, wherein the water delivery system is configured to perform job-site cleaning of concrete residue from the concrete mixer truck, and wherein the water delivery system comprises: one or more conduits configured to distribute pressurized water; one or more valves configured to control flow of pressurized water within the one or more conduits; and a plurality of spray headers coupled to the one or more conduits, including a first spray header fixedly coupled to the concrete mixer truck and configured to dispense pressurized water to clean a surface of the collection hopper or a rear portion of the mixing drum in response to operation of a particular valve of the one or more valves.

2. The concrete mixer truck of any other embodiment, wherein the particular valve is a hand-operable switch.

3. The concrete mixer truck of any other embodiment, wherein the hand-operable switch is a dead man's switch.

4. The concrete mixer truck of any other embodiment, further comprising a timing device configured to display information indicative of an amount of time that the particular valve has been turned on.

5. The concrete mixer truck of any other embodiment, wherein the particular valve is configured to automatically turn off after a predetermined time interval or volume amount.

6. The concrete mixer truck of any other embodiment, wherein the particular valve is located no more than 6 feet above the ground.

7. The concrete mixer truck of any other embodiment, further comprising a diaphragm pump configured to receive water from the water tank, pressurize the received water, and output the pressurized water to the one or more conduits.

8. The concrete mixer truck of any other embodiment, wherein the one or more valves include a plurality of valves, and wherein the plurality of valves are respectively operable to cause pressurized water to be dispensed at different ones of the plurality of spray headers.

9. The concrete mixer truck of any other embodiment, wherein the particular valve is operable to cause water to be dispensed to clean the collection hopper, and wherein the plurality of valves includes a second valve, and wherein the plurality of spray headers include a second spray header configured, in response to operation of the second valve, to dispense pressurized water to clean elements within the rear portion of the mixing drum.

10. The concrete mixer truck of any other embodiment, wherein the elements within the rear portion of the mixing drum include one or more of the following: surge blade, discharge blade, drip ring, or any combination thereof.

11. The concrete mixer truck of any other embodiment, wherein the plurality of valves includes a second valve, and wherein the plurality of spray headers include a second spray header configured, in response to operation of the second valve, to dispense pressurized water to clean a portion of the surface of the collection hopper.

12. The concrete mixer truck of any other embodiment, wherein the first spray header is configured to clean a portion of the collection hopper, and wherein the second spray header is fixedly coupled to the concrete mixer truck to dispense pressurized water to clean a different portion of the surface of the collection hopper than the first spray header.

13. The concrete mixer truck of any other embodiment, wherein the particular valve is operable to cause water to be dispensed via at least two of the plurality of spray headers at the same time.

14. The concrete mixer truck of any other embodiment, further comprising: a hose, a first end of which is coupled to the water tank; a nozzle coupled to a second end of the hose; and retention means for securing the nozzle and the second end of the hose during transit, and for permitting release of the second end of the hose and the nozzle such that the second end of the hose and the nozzle are freely movable by an operator of the concrete mixer truck.

15. The concrete mixer truck of any other embodiment, wherein the first spray header is positioned to dispense pressurized water via an aperture in a bracket fixedly coupled to the collection hopper.

16. The concrete mixer truck of any other embodiment, further comprising a camera configured to provide an image or video of a portion of a rear portion of the truck.

17. The concrete mixer truck of any other embodiment, wherein the first spray header is located closer to a first side of the concrete mixer truck than a second side, the truck further comprising a guard element positioned between the first spray header and the first side of the truck.

18. The concrete mixer truck of any other embodiment, wherein the guard element is made of metal.

19. A concrete mixer truck, comprising: a chassis assembly that includes a cab and a frame coupled to a rear portion of the cab; a mixing drum coupled to the chassis assembly, wherein the mixing drum is configured to mix input ingredients to produce concrete, and to discharge the produced concrete; a discharge assembly positioned to receive concrete from the mixing drum and configured to direct the received concrete; a water delivery system configured to remain in place when the concrete mixer truck is in transit, wherein the water delivery system is configured to perform job-site cleaning of concrete residue from the concrete mixer truck, and wherein the water delivery system comprises: one or more conduits configured to distribute pressurized water; one or more valves configured to control flow of pressurized water within the one or more conduits; and a plurality of spray headers coupled to the one or more conduits, including a first spray header fixedly coupled to the concrete mixer truck at least 8 feet above the ground to automatically dispense pressurized water to clean a portion of the concrete mixer truck in response to operation of a particular valve of the one or more valves.

20. The concrete mixer truck of any other embodiment, wherein the particular valve is a hand-operable switch.

21. The concrete mixer truck of any other embodiment, wherein the switch is a dead man's switch.

22. The concrete mixer truck of any other embodiment, further comprising a timing device configured to display information indicative of an amount of time that the particular valve has been turned on.

23. The concrete mixer truck of any other embodiment, wherein the particular valve is configured to automatically turn off after a predetermined time interval or water volume amount.

24. The concrete mixer truck of any other embodiment, wherein the particular valve is located no more than 6 feet above the ground.

25. The concrete mixer truck of any other embodiment, further comprising a diaphragm pump configured to draw water from a water tank, pressurize the drawn water, and output the pressurized water to the one or more conduits.

26. The concrete mixer truck of any other embodiment, wherein the one or more valves include a plurality of valves, and wherein the plurality of valves are respectively operable to cause pressurized water to be dispensed at different ones of the plurality of spray headers.

27. The concrete mixer truck of any other embodiment, wherein the particular valve is operable to cause water to be dispensed via at least two of the plurality of spray headers at the same time.

28. The concrete mixer truck of any other embodiment, further comprising: a hose, a first end of which is coupled to a water tank; a nozzle coupled to a second end of the hose; and retention means for securing the nozzle and the second end of the hose during transit, and for permitting release of the second end of the hose and the nozzle such that the second end of the hose and the nozzle are freely movable by an operator of the concrete mixer truck.

29. The concrete mixer truck of any other embodiment, further comprising a camera configured to provide an image or video of a rear portion of the concrete mixer truck located at least 7 feet above the ground.

30. The concrete mixer truck of any other embodiment, wherein the first spray header is located closer to a first side of the concrete mixer truck than a second side, the truck further comprising a guard element positioned between the first spray header and the first side of the truck.

31. The concrete mixer truck of any other embodiment, wherein the guard element includes a metallic component.

32. A concrete mixer truck, comprising: a chassis assembly that includes a cab and a frame coupled to a rear portion of the cab; a mixing drum coupled to the chassis assembly, wherein the mixing drum includes at least one blade configured to mix input ingredients to produce concrete, and to discharge the produced concrete; a discharge assembly positioned to receive concrete from the mixing drum and configured to direct the received concrete; a water delivery system configured to remain in place when the concrete mixer truck is in transit, wherein the water delivery system is configured to perform job-site cleaning of concrete residue from the concrete mixer truck, and wherein the water delivery system comprises: one or more conduits configured to distribute pressurized water; one or more valves configured to control flow of pressurized water within the one or more conduits; and two or more spray headers fixedly coupled to the concrete mixer truck to receive pressurized water via the one or more conduits, wherein the two or more spray headers are configured, in response to operation of a particular valve of the one or more valves, to simultaneously dispense pressurized water to clean concrete residue from one or more rear portions of the concrete mixer truck.

33. The concrete mixer truck of any other embodiment, wherein the particular valve is a hand-operable switch.

34. The concrete mixer truck of any other embodiment, wherein the hand-operable switch is a dead man's switch.

35. The concrete mixer truck of any other embodiment, further comprising a timing device configured to display information indicative of an amount of time that the particular valve has been turned on.

36. The concrete mixer truck of any other embodiment, wherein the particular valve is configured to automatically turn off after a predetermined time interval.

37. The concrete mixer truck of any other embodiment, wherein the particular valve is located no more than 6 feet above the ground.

38. The concrete mixer truck of any other embodiment, further comprising a diaphragm pump configured to receive water from a water tank, pressurize the received water, and output the pressurized water to the one or more conduits.

39. The concrete mixer truck of any other embodiment, wherein the one or more valves include a plurality of valves, and wherein the plurality of valves are respectively operable to cause pressurized water to be dispensed at different ones of the two or more spray headers.

40. The concrete mixer truck of any other embodiment, further comprising: a hose, a first end of which is coupled to a water tank; a nozzle coupled to a second end of the hose; and retention means for securing the nozzle and the second of the hose during transit, and for permitting release of the second end of the hose and the nozzle such that the second end of the hose and the nozzle are freely movable by an operator of the concrete mixer truck.

41. The concrete mixer truck of any other embodiment, wherein the two or more spray headers are positioned to dispense pressurized water via an aperture in a bracket fixedly coupled to a collection hopper within the discharge assembly.

42. The concrete mixer truck of any other embodiment, further comprising a camera configured to provide an image or video of an upper rear portion of the truck.

43. The concrete mixer truck of any other embodiment, wherein the two or more spray headers include a first spray header located closer to a first side of the concrete mixer truck than a second side, the truck further comprising a guard element positioned between the first spray header and the first side of the truck.

44. The concrete mixer truck of any other embodiment, wherein the guard element includes a metallic component.

45. A method, comprising: operating an in-transit concrete mixer truck to dispense concrete; and after dispensing the concrete, operating a cleaning system coupled to the truck to clean concrete residue from one or more back-end portions of the truck; wherein the cleaning system includes a water delivery system configured to deliver pressurized water via one or more conduits to a plurality of spray headers coupled to the truck, wherein the cleaning system further includes one or more valves operable to control the release of pressurized water from the plurality of spray headers to automatically clean one or more back-end portions of the truck.

46. The method of any other embodiment, wherein the one or more back-end portions include at least a portion of a surface of a collection hopper.

47. The method of any other embodiment, wherein the one or more back-end portions include at least a rear portion of a mixing drum of the truck.

48. The method of any other embodiment, wherein at least one of the one or more back-end portions is at least 8 feet above the ground.

49. The method of any other embodiment, wherein a particular one of the one or more valves is operable to release pressurized water from at least two of the plurality of spray headers at the same time.

50. A concrete mixer truck, comprising: a chassis assembly that includes a cab and a frame coupled to a rear portion of the cab; a mixing drum coupled to the chassis assembly, wherein the mixing drum is configured to mix input ingredients to produce concrete, and wherein a rear portion of the mixing drum is configured to discharge concrete; a discharge assembly positioned to receive concrete from the mixing drum and configured to direct the received concrete, wherein the discharge assembly includes a collection hopper; a cleaning system coupled to the concrete mixer truck and configured to remain in place when the concrete mixer truck is in transit, wherein the cleaning system includes: one or more conduits configured to distribute pressurized water; one or more valves that control water flow within the one or more conduits; one or more spray headers configured to dispense pressurized water delivered via the one or more conduits; and a computing device electrically coupled to the one or more valves, wherein the computing device is configured to automatically operate the one or more valves to release pressurized water from at least one of the one or more spray headers, including to one or more portions of the discharge assembly or the rear portion of the mixing drum.

51. The concrete mixer truck of any other embodiment, wherein the cleaning system further comprises a user interface control, including a portion selectable to initiate cleaning concrete residue from the concrete mixer truck.

52. The concrete mixer truck of any other embodiment, wherein the user interface control is within the cab.

53. The concrete mixer truck of any other embodiment, wherein the user interface control is located within a control unit positioned on an exterior of a driver-side portion of the truck.

54. The concrete mixer truck of any other embodiment, wherein the portion of the user interface control is a button.

55. The concrete mixer truck of any other embodiment, wherein the portion of the user interface control is a portion of a touch screen.

56. The concrete mixer truck of any other embodiment, wherein the cleaning system, in response to selection of the portion of the user interface control, is configured to perform the cleaning according to a washing protocol, and wherein the cleaning system is configured to automatically terminate the cleaning upon conclusion of the washing protocol.

57. The concrete mixer truck of any other embodiment, wherein the user interface control includes a second portion selectable to terminate the cleaning of the concrete mixer truck.

58. The concrete mixer truck of any other embodiment, wherein the portion of the user interface control is selectable to initiate cleaning concrete residue from the concrete mixer truck according to a washing protocol.

59. The concrete mixer truck of any other embodiment, wherein the washing protocol specifies one or more time intervals during which the one or more valves are open.

60. The concrete mixer truck of any other embodiment, wherein the washing protocol specifies a sequence to operate the one or more spray headers, wherein the sequence includes two or more steps, each of which includes directing pressurized water to a subset of the one or more spray headers for a time interval or water volume amount corresponding to that step.

61. The concrete mixer truck of any other embodiment, wherein the washing protocol is user-selectable from a plurality of different washing protocols.

62. The concrete mixer truck of any other embodiment, wherein the cleaning system is configured to automatically terminate the cleaning of the concrete mixer truck after a predetermined washing protocol has been performed, and wherein the second portion of the user interface control is selectable to terminate the cleaning of the concrete mixer truck prior to the predetermined washing protocol concluding.

63. The concrete mixer truck of any other embodiment, wherein the computing device is electrically coupled to the one or more valves via a communication bus.

64. The concrete mixer truck of any other embodiment, wherein the communication bus is configured to use a CAN bus protocol.

65. The concrete mixer truck of any other embodiment, wherein the computing device is electrically coupled to the one or more valves via one or more hardwired control lines.

66. The concrete mixer truck of any other embodiment, wherein the discharge assembly includes a chute positioned to receive concrete from the collection hopper and configured to direct and dispense the received concrete, and wherein the cleaning system is configured to clean at least a portion of the chute.

67. The concrete mixer truck of any other embodiment, wherein the cleaning system further includes a first hose coupled to a water supply at a first end and to a hand-operable nozzle at a second end, wherein the second end is freely movable by an operator of the concrete mixer truck, and wherein the first hose is of sufficient length to permit operator cleaning of the chute.

68. The concrete mixer truck of any other embodiment, wherein the discharge assembly includes a drum hoop, pedestal support structure, and one or more chutes.

69. The concrete mixer truck of any other embodiment, further comprising a ladder coupled to the concrete mixer truck, wherein the ladder is positioned to permit user access from the ground to at least a point that permits visual inspection of the collection hopper.

70. The concrete mixer truck of any other embodiment, wherein the cleaning system further comprises a plurality of hoses coupled to receive water from a water supply and configured to permit operator cleaning of the concrete mixer truck, wherein at least one of the hoses is accessible via a ladder coupled to the concrete mixer truck.

71. The concrete mixer truck of any other embodiment, wherein the cleaning system further comprises a pressurized water tank configured to supply pressurized water to the one or more conduits.

72. The concrete mixer truck of any other embodiment, wherein the cleaning system is configured to dispense water from the one or more spray headers at a pressure level between 40 and 150 pounds per square inch.

73. The concrete mixer truck of any other embodiment, wherein the cleaning system further comprises: a water tank; and a diaphragm pump configured to draw unpressurized water from the water tank and provide pressurized water to the one or more conduits.

74. The concrete mixer truck of any other embodiment, wherein the cleaning system is releasably secured to the concrete mixer truck.

75. The concrete mixer truck of any other embodiment, wherein the cleaning system is permanently affixed to the concrete mixer truck.

76. The concrete mixer truck of any other embodiment, wherein the computing device is configured to automatically turn on the one or more valves to dispense water.

77. The concrete mixer truck of any other embodiment, wherein the computing device is configured to automatically turn off the one or more valves to shutoff water.

78. The concrete mixer truck of any other embodiment, wherein the cleaning system is configured to dispense water to clean a rear portion of the mixing drum.

79. The concrete mixer truck of any other embodiment, further comprising a charge hopper positioned to receive and direct the input ingredients into the mixing drum, wherein the cleaning system is configured to automatically operate the one or more valves to dispense water to clean a surface of the charge hopper.

80. The concrete mixer truck of any other embodiment, wherein the computing device is operable to dispense water to two or more different portions of the discharge assembly at the same time.

81. The concrete mixer truck of any other embodiment, wherein the cleaning system is configured to clean the following portions of the concrete mixer truck: discharge blade, drum surge blade, drum shell, drum drip ring, interior portion of a collection hopper, or any combination thereof.

82. The concrete mixer truck of any other embodiment, wherein the one or more spray headers include a plurality of sets of spray headers, and wherein the computing device is configured to sequence the release of pressurized water to different ones of the plurality of sets of spray headers.

83. The concrete mixer truck of any other embodiment, wherein the plurality of sets of spray headers include at least a first set of one or more spray headers and a second set of one or more spray headers.

84. The concrete mixer truck of any other embodiment, wherein the computing device is configured to automatically operate the one or more valves to control the release of pressurized water to the first set of spray headers but not the second set of spray headers.

85. The concrete mixer truck of any other embodiment, wherein the computing device is configured to automatically operate the one or more valves to control the release of pressurized water to the first set of spray headers for a first time interval or for a first water volume amount and to subsequently control the release of pressurized water to the second set of spray headers for a second time interval or for a second water volume amount.

86. The concrete mixer truck of any other embodiment, wherein the first and second time intervals or the first and second water volume amounts are different.

87. The concrete mixer truck of any other embodiment, wherein the first and second time intervals are user-adjustable.

88. The concrete mixer truck of any other embodiment, wherein the one or more conduits include flexible tubing.

89. The concrete mixer truck of any other embodiment, wherein at least one of the one or more spray headers is coupled to a portion of the concrete mixer truck that is at least 8 feet above the ground.

90. The concrete mixer truck of any other embodiment, further comprising at least a first bracket coupled to the concrete mixer truck, wherein a first spray header of the one or more spray headers is coupled to the first bracket.

91. The concrete mixer truck of any other embodiment, further comprising a guard element coupled to the concrete mixer truck to protect the first spray header.

92. The concrete mixer truck of any other embodiment, wherein the guard element is made of metal.

93. The concrete mixer truck of any other embodiment, wherein the one or more spray headers includes three or more spray headers, and wherein the computing device is configured to automatically operate the one or more valves to release water to all of the three or more spray headers at the same time to clean concrete residue from the concrete mixer truck in a single cycle.

94. The concrete mixer truck of any other embodiment, wherein the cleaning system includes a first bracket affixed to a drum hoop, and wherein a first spray header of the one or more spray headers is coupled to the first bracket and positioned to clean at least one of the following portions of the concrete mixer truck located within the mixing drum: surge blade, discharge blade.

95. The concrete mixer truck of any other embodiment, wherein the cleaning system includes a second bracket affixed to a driver-side portion of a collection hopper, and wherein a second spray header of the one or more spray headers is coupled to the second bracket and positioned to clean the discharge blades.

96. The concrete mixer truck of any other embodiment, wherein the cleaning system includes third and fourth spray headers coupled to the second bracket and positioned to dispense water in a downward direction to clean a driver-side corner of the collection hopper, and wherein the cleaning system includes a fifth spray header coupled to the second bracket and positioned to clean an inside of a rearmost face of the collection hopper.

97. The concrete mixer truck of any other embodiment, wherein the cleaning system includes a third bracket affixed to a passenger side of the collection hopper, wherein the cleaning system includes sixth and seventh spray headers coupled to the third bracket and positioned to dispense water in a downward direction to clean a passenger-side corner of the collection hopper, and wherein the cleaning system includes an eighth spray header coupled to the third bracket and positioned to clean a different portion of an inside of a rearmost face of the collection hopper.

98. The concrete mixer truck of any other embodiment, wherein the cleaning system includes a second bracket affixed to a driver-side portion of a collection hopper, and wherein a second spray header of the one or more spray headers is coupled to the second bracket and positioned to clean discharge blades within the mixing drum.

99. The concrete mixer truck of any other embodiment, wherein the cleaning system includes third and fourth spray headers coupled to the second bracket and positioned to dispense water in a downward direction to clean a driver-side corner of the collection hopper, and wherein the cleaning system includes a fifth spray header coupled to the second bracket and positioned to clean an inside of a rearmost face of the collection hopper.

100. The concrete mixer truck of any other embodiment, wherein the cleaning system includes a third bracket affixed to a passenger side of a collection hopper, wherein the cleaning system includes sixth and seventh spray headers coupled to the third bracket and positioned to dispense water in a downward direction to clean a passenger-side corner of the collection hopper, and wherein the cleaning system includes an eighth spray header coupled to the third bracket and positioned to clean an inside of a rearmost face of the collection hopper.

101. The concrete mixer truck of any other embodiment, wherein the cleaning system is configured to measure an amount of water dispensed from a water tank of the truck.

102. The concrete mixer truck of any other embodiment, further comprising one or more cameras configured to display portions of the concrete mixer truck not visible from the ground, including portions of the discharge assembly, wherein the one or more cameras are usable to verify that concrete residue has been cleaned from the concrete mixer truck by the cleaning system.

103. The concrete mixer truck of any other embodiment, further comprising a memory storing program instructions executable by the computing device to automatically operate the one or more valves.

104. A method, comprising: operating an in-transit concrete mixer truck to dispense concrete; and after dispensing the concrete, instructing a cleaning system coupled to the truck to initiate a process to clean concrete residue from the truck; wherein the cleaning system includes a water delivery system configured to deliver pressurized water via one or more conduits to one or more spray headers coupled to the truck, wherein the cleaning system further includes a computing device electrically coupled to one or more valves and configured to automatically operate the one or more valves to control the release of pressurized water from the one or more spray headers to clean concrete residue from one or more back-end portions of the truck.

105. The method of any other embodiment, wherein the cleaning system is configured to clean the one or more back-end portions of the truck without requiring an operator of the truck to manually clean any of the one or more back-end portions of the truck from a ladder mounted to the truck.

106. The method of any other embodiment, wherein the cleaning system is configured to clean the truck without requiring an operator of the truck to use a hose to manually clean a collection hopper of the truck.

107. The method of any other embodiment, wherein the instructing includes selecting one of a predetermined set of washing protocols.

108. The method of any other embodiment, further comprising the cleaning system automatically discontinuing releasing water from the one or more spray headers after concluding a washing protocol.

109. The method of any other embodiment, wherein the process includes cleaning the one or more back-end portions of the truck by performing a washing protocol that includes selectively turning on different subsets of the one or more spray headers at different times.

110. The method of any other embodiment, wherein the process includes cleaning the one or more back-end portions of the truck by performing a washing protocol that includes a single washing cycle in which all of the one or more spray headers are turned on at once.

111. The method of any other embodiment, wherein the computing device is further configured to cause a drum of the truck to rotate during the process to clean the concrete residue from the truck.

112. The method of any other embodiment, wherein the computing device is further configured to activate a warning system during the process to clean the concrete residue from the truck.

113. The method of any other embodiment, wherein the warning system includes at least one warning light.

114. The method of any other embodiment, wherein the warning system includes at least one audible alarm.

115. A concrete mixer truck, comprising: a mixing drum configured to mix input ingredients to produce concrete and discharge the concrete; a collection hopper positioned to receive concrete from the mixing drum and configured to direct the received concrete; cleaning means for washing the collection hopper; water delivery means for providing water to the cleaning means; and control means for operating the cleaning means.

116. The concrete mixer truck of any other embodiment, wherein the cleaning means for washing the collection hopper is further for washing at least a portion of the mixing drum.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used in the appended claims, the term "comprising" does not foreclose additional structure or steps. Consider a claim that recites: "An apparatus comprising a spray header . . . ." Such a claim does not foreclose the apparatus from including additional spray headers or other components.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. As one example, a "computerized system" that is "configured to execute a washing protocol" is intended to cover, for example, a microcontroller that performs this function during operation, even if it is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function, and may, after programming, be "configured to" perform that function.

Reciting in the appended claims that a structure is "configured to" perform one or more tasks is expressly intended not to invoke 35 U.S.C. § 112(f) for that claim element. A claim element in this application should only be interpreted under § 112(f) if it explicitly recites the phrase "means for" [performing a function].

A distinction is made in this disclosure between an item that is "fixedly coupled" and one that is "freely movable." In the various disclosed embodiments, for example, spray headers are described as being "fixedly coupled" to concrete mixer truck. As used herein, this phrase means that the spray header is attached to the concrete mixer truck such that the spray header does not move during operation of the truck. For example, consider a spray header positioned on one side of the collection hopper to clean an opposite side of the collection hopper. If such a spray header is "fixedly coupled" to the concrete mixer truck, this means that the coupling is designed to maintain the location of the spray header, such that, when operated, the spray header will continue to clean a corresponding portion of the truck. In some embodiments, a fixedly coupled spray header may also be movably coupled to a conduit, such that the orientation, but not the location, of the spray header can rotate, oscillate, vibrate, or otherwise move internally or externally to clean a larger surface area.

In contrast, consider a standard water hose with a hand-operable nozzle found on concrete mixer trucks. A first end of such a hose may be fixedly coupled to the water tank. A second end of the hose with the nozzle, however, is designed to be freely movable such that an operator of the truck can move the nozzle in any desired direction to clean concrete residue from the truck. (Of course, during transit, the second end of the hose may be releasably secured to the truck using any suitable retention mechanism, including a hook, clasp, latch, spring, and the like. When desired, such as at a job site, an operator of the truck may release the second end of the hose to make it freely movable.)

This disclosure also draws distinctions regarding the ease with which one item can be removed from another item—for instance, components of the cleaning system from the concrete mixer truck, which can variously be said to be "permanently affixed" to the concrete mixer truck, "releasably secured" to the truck, etc. The phrase "permanently affixed" is not intended to connote that the cleaning system is affixed such that it physically cannot be removed from the truck, but rather that it is intended to be an integral part of the truck and is not removable under normal usage. In contrast, the phrase "releasably secured" connotes a type of coupling that contemplates and permits easy removable during normal usage of the cleaning system. The nozzle end of a standard hose on a concrete mixer truck used for operator cleaning can be said to be releasably secured to the truck by being placed on a hook or clasp, for example. Note that an item that is "fixedly coupled" to another item may also be "permanently affixed" or "releasably secured" in various embodiments. "Fixedly coupled" refers to the amount of movement that an item can experience, while "permanently affixed" and "releasably secured" refer to the ease in removing one item from another.

Certain recitations in the disclosure may be made via a list of items, concluding with the phrase "or any combination thereof." Such a recitation is intended to cover any individual item in the list, all items in the list in combination, and any proper subset of items from the list. Consider the phrase "wherein the cleaning system is configured to clean the following portions of the concrete mixer truck: discharge blade, drum surge blade, drum shell, drum drip ring, interior portion of a collection hopper, or any combination thereof." This recitation is intended to cover a cleaning system that is configured to clean just a single listed portion of the concrete mixer truck (e.g., the drip ring), a system that is configured to clean all of the listed portions, as well as a system that is configured to clean some but not all of the listed portions. Similarly, consider the phrase "at least one of the following portions of the concrete mixer truck: surge blade, discharge blade." This phrase is intended to cover the surge blade but not the discharge blade, the discharge blade but not the surge blade, and both the surge and discharge blades.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, by a computing device configured to control a plurality of valves, user input to initiate washout of a rear portion of a concrete mixer truck; and
   in response to the user input, performing, by the computing device without further user input, washout of the rear portion of the concrete mixer truck, including by:
      causing, by the computing device, a first valve of the plurality of valves to be opened, wherein the first valve is configured to control water flow to a first subset of spray headers that are positioned to clean a first portion of the concrete mixer truck;
      determining, by the computing device, that a first condition has been met;
      in response to determining that the first condition has been met, causing, by the computing device, the first valve to be closed;
      subsequent to causing the first valve to be closed, causing, by the computing device, a second valve of the plurality of valves to be opened, wherein the second valve is configured to control water flow to a second subset of spray headers that are positioned to clean a second portion of the concrete mixer truck;
      determining, by the computing device, that a second condition has been met;
      in response to determining that the second condition has been met, causing, by the computing device, the second valve to be closed; and
      controlling turning of a mixing drum of the concrete mixer truck while at least one of the first valve or the second valve is open.

2. The method of claim 1, further comprising:
   prior to causing the first valve to be opened, detecting, by the computing device, that a parking brake of the concrete mixer truck is applied and that the concrete mixer truck is in neutral gear; and in response to the detecting, initiating, by the computing device, washout of the rear portion of the concrete mixer truck.

3. The method of claim 1, wherein the user input indicates a selection of a washing protocol from a plurality of washing protocols; and
in response to receiving the selection, initiating, by the computing device, execution of the washing protocol.

4. The method of claim 3, wherein at least two of the plurality of washing protocols correspond to different types of concrete.

5. The method of claim 3, wherein the plurality of washing protocols includes a first washing protocol that is permanently programmed and a second washing protocol that is user-configurable.

6. The method of claim 3, wherein the washing protocol specifies rotations of the mixing drum before the first valve is opened and after the second valve is closed.

7. The method of claim 1, further comprising in response to the user input and prior to performing the washout, presenting one or more warnings to notify personnel that the washout is about to commence.

8. The method of claim 1, wherein the first subset of spray headers is positioned to clean a portion of the mixing drum; and wherein the second subset of spray headers are positioned to clean a different portion of the concrete mixer truck.

9. The method of claim 1, wherein performing washout of the rear portion of the concrete mixer truck further includes:
capturing visual information about the washout; and
causing the visual information to be displayed to a user.

10. The method of claim 1,
wherein the first valve is a pneumatically actuated water valve;
wherein causing the first valve to be opened includes the computing device electronically controlling an air valve to cause pressurized air to open the pneumatically actuated water valve; and
wherein causing the first valve to be closed includes the computing device electronically controlling the air valve to cause pressurized air to close the pneumatically actuated water valve.

11. An article of manufacture including a non-transitory, computer-readable medium having instructions stored thereon that are executable by a computing device to carry out operations comprising:
receiving a user selection of a washing protocol for washing a concrete mixer truck, wherein the washing protocol specifies one or more time intervals during which selected valves should be open;
based on the selected washing protocol, causing an engine speed of the concrete mixer truck to change to a particular engine speed;
based on the selected washing protocol, causing a drum rotation direction and a drum speed of a mixing drum of the concrete mixer truck to change to a selected drum rotation direction and a particular drum speed;
based on the selected washing protocol, causing a first water valve of the concrete mixer truck to open, wherein the first water valve is operable to dispense pressurized water via a first set of one or more spray headers located at a rear portion of the concrete mixer truck;
based on the selected washing protocol, causing the first water valve to close after a first amount of time;
based on the selected washing protocol, causing a second water valve of the concrete mixer truck to open, wherein the second water valve is operable to dispense pressurized water via a second set of one or more spray headers located at a rear portion of the concrete mixer truck; and
based on the selected washing protocol, causing the second water valve to close after a second amount of time.

12. The article of claim 11, wherein the operations further comprise:
verifying that the concrete mixer truck is in neutral gear and that a parking brake of the concrete mixer truck is applied.

13. The article of claim 11, wherein the operations further comprise:
subsequent to causing the second water valve to close, causing a dump valve of the concrete mixer truck to open, wherein the dump valve is operable to remove residual water from water lines of the concrete mixer truck and return the residual water to a water tank of the concrete mixer truck.

14. The article of claim 11, wherein the computing device is coupled to the concrete mixer truck via a CAN bus protocol.

15. An article of manufacture including a non-transitory, computer-readable medium having instructions stored thereon that are executable by a computing device to carry out operations comprising:
receiving, by a computing device configured to control a plurality of valves, user input to initiate washout of a rear portion of a concrete mixer truck; and
in response to the user input, performing, by the computing device without further user input, washout of the rear portion of the concrete mixer truck, including by:
causing, by the computing device, a first valve of the plurality of valves to be opened, wherein the first valve is configured to control water flow to a first subset of spray headers that are positioned to clean a first portion of the concrete mixer truck;
determining, by the computing device, that a first condition has been met;
in response to determining that the first condition has been met, causing, by the computing device, the first valve to be closed;
subsequent to causing the first valve to be closed, causing, by the computing device, a second valve of the plurality of valves to be opened, wherein the second valve is configured to control water flow to a second subset of spray headers that are positioned to clean a second portion of the concrete mixer truck;
determining, by the computing device, that a second condition has been met;
in response to determining that the second condition has been met, causing, by the computing device, the second valve to be closed; and
controlling rotation of a mixing drum of the concrete mixer truck during the washout.

16. The article of claim 15, the operations further comprising:
prior to causing the first valve to be opened, detecting, by the computing device, that a parking brake of the concrete mixer truck is applied and that the concrete mixer truck is in neutral gear; and
in response to the detecting, initiating, by the computing device, washout of the rear portion of the concrete mixer truck.

17. The article of claim 15, wherein the user input indicates a selection of a washing protocol from a plurality of washing protocols; and in response to receiving the selection, initiating, by the computing device, execution of the washing protocol.

18. The article of claim 17, wherein at least two of the plurality of washing protocols correspond to different types of concrete.

19. The article of claim 15, wherein the first subset of spray headers is positioned to clean a portion of the mixing drum; and wherein the second subset of spray headers are positioned to clean a different portion of the concrete mixer truck.

20. The article of claim 15, wherein the operations further comprise:

subsequent to causing the second valve to close, causing a dump valve of the concrete mixer truck to open, wherein the dump valve is operable to remove residual water from water lines of the concrete mixer truck and return the residual water to a water tank of the concrete mixer truck.

\* \* \* \* \*